(12) United States Patent
Perez et al.

(10) Patent No.: US 9,678,579 B2
(45) Date of Patent: Jun. 13, 2017

(54) MOBILE CAST RECEIVERS FOR COMPUTING AND ENTERTAINMENT DEVICES

(71) Applicant: GOOGLE INC., Mountain View, CA (US)

(72) Inventors: Alberto Martin Perez, Mountain View, CA (US); James Neil Weatherall, Kirkland, WA (US); Felix Lin, Hillsborough, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/318,069

(22) Filed: Jun. 27, 2014

(65) Prior Publication Data
US 2015/0378445 A1    Dec. 31, 2015

(51) Int. Cl.
*G06F 3/02*       (2006.01)
*G06F 3/023*      (2006.01)
*H04L 29/06*      (2006.01)
*G06F 3/0489*     (2013.01)

(52) U.S. Cl.
CPC ............ *G06F 3/0231* (2013.01); *G06F 3/023* (2013.01); *G06F 3/0489* (2013.01); *H04L 65/60* (2013.01); *G06F 2203/0383* (2013.01)

(58) Field of Classification Search
USPC ...... 345/168, 173, 156; 600/513; 455/456.1; 725/39; 370/338; 340/8.1
See application file for complete search history.

(56) References Cited

U.S. PATENT DOCUMENTS

| 7,167,142 B2 | 1/2007  | Buckley et al. |
| 8,072,905 B2 | 12/2011 | Haff et al.    |
| 8,225,191 B1 | 7/2012  | Kalman         |
| 8,570,358 B2 | 10/2013 | Jing et al.    |

(Continued)

FOREIGN PATENT DOCUMENTS

| WO | 0111903 A1       | 2/2001  |
| WO | 2015/200507 A1   | 12/2015 |

OTHER PUBLICATIONS

Richardson et al., "Virtual Network Computing", IEEE, vol. 2, No. 1, Jan./Feb. 1998, 7 pages.

(Continued)

*Primary Examiner* — Thuy Pardo
(74) *Attorney, Agent, or Firm* — Brake Hughes Bellermann LLP

(57) ABSTRACT

In one general aspect, a computing system includes a cast terminal including a keyboard component and a display component physically coupled to the keyboard component, and a central computing device. The keyboard component includes a first communication module configured to transmit keystroke data over a first wireless network to the central computing device using a first wireless communication protocol. The display component includes a second communication module configured to receive multimedia data over a second wireless network from the central computing device using a second wireless communication protocol. The central computing device includes a third communication module configured to receive the keystroke data from the first wireless network, and a fourth communication module configured to transmit the multimedia data over the second wireless network.

20 Claims, 13 Drawing Sheets

(56) References Cited

U.S. PATENT DOCUMENTS

| | | | |
|---|---|---|---|
| 8,572,483 | B1 | 10/2013 | DiLorenzo |
| 8,612,641 | B1 | 12/2013 | Bozarth et al. |
| 8,681,811 | B2 | 3/2014 | Kipnis et al. |
| 8,683,527 | B2 | 3/2014 | Pratt et al. |
| 2002/0165863 | A1 | 11/2002 | Shoher et al. |
| 2004/0236840 | A1 | 11/2004 | Sarkar et al. |
| 2005/0143671 | A1* | 6/2005 | Hastings et al. ............ 600/513 |
| 2006/0090069 | A1 | 4/2006 | Burokas et al. |
| 2009/0184929 | A1* | 7/2009 | Chou .................. G06F 3/0202 345/172 |
| 2009/0238204 | A1 | 9/2009 | Kipnis et al. |
| 2009/0244027 | A1* | 10/2009 | Yoshida .................. C08J 7/047 345/174 |
| 2009/0267952 | A1* | 10/2009 | Yan ........................ H04N 7/163 345/520 |
| 2010/0019990 | A1* | 1/2010 | Lee ..................... G01C 21/362 345/2.2 |
| 2010/0177750 | A1* | 7/2010 | Essinger ............... H04L 67/12 370/338 |
| 2011/0113121 | A1 | 5/2011 | Sarkar |
| 2011/0261070 | A1* | 10/2011 | Rivaz ..................... H04N 7/04 345/619 |
| 2012/0040686 | A1* | 2/2012 | Cho ..................... H04W 4/021 455/456.1 |
| 2012/0102106 | A1 | 4/2012 | Chen et al. |
| 2012/0151525 | A1* | 6/2012 | Demchenko ......... H04N 21/482 725/39 |
| 2012/0163181 | A1 | 6/2012 | Xue et al. |
| 2012/0185785 | A1 | 7/2012 | Avellan et al. |
| 2013/0015954 | A1* | 1/2013 | Thorne ................ G06F 17/241 340/8.1 |
| 2013/0094783 | A1 | 4/2013 | Pan |
| 2013/0113993 | A1 | 5/2013 | Dagit, III |
| 2015/0026723 | A1* | 1/2015 | Yuriy et al. ..................... 725/39 |
| 2015/0161372 | A1* | 6/2015 | Mullin ......................... 345/168 |
| 2015/0381437 | A1 | 12/2015 | Perez et al. |

OTHER PUBLICATIONS

Kovacs, Balazs, "Design and Implementation of Distributed Applications in Ad Hoc Network Environment", Master's Thesis, 2003, 81 pages.

Malik, OM, "The Network Computer Arrives . . . Finallyl", Tech News and Analysis, Dec. 7, 2010, 8 pages.

DisplayLink, "DisplayLink DL-1x5 Series", 2011, 2 pages.

Axel, "Axel Ultra Thin Client Technology", retrieved on Jun. 27, 2014 from http://www.axel.com/focus2/ultrathinclient_e.html, 2 pages.

Dell, "Dell Wyse Thin Client:Expand Your Horizons with Cloud Client Computing", retrieved on Jun. 27, 2014 from http://partnerdirect.dell.com/sites/channel/en_us/Products/TC/Pages/ThinClients.aspx, 4 pages.

VNC, "Virtual Network Computing", AT&T Laboratories Cambridge, retrieved on Jun. 27, 2014 from http://www.cl.cam.ac.uk/research/dtg/attarchive/vnc/index.html, 2 pages.

International Search Report and Written Opinion for PCT Application No. PCT/US2015/037467, mailed on Oct. 6, 2015, 10 pages.

Non Final Office Action for U.S. Appl. No. 14/318,051, mailed on Jun. 27, 2016, 22 Pages.

Final Office Action received for U.S. Appl. No. 14/318,051, mailed on Dec. 30, 2016, 33 pages.

"Introducing JavaStation: Sun's Enterprise Desktop Alternative to Transform Network Computing", retrieved on Jan. 12, 2017 from http://tech-insider.org/java/research/1996/1029.html, Oct. 29, 1996, 5 pages.

"Mobile Network Computing Reference Specification", Mobile Network Computing Reference Specification Consortium, Version 1.1, retrieved on Jan. 12, 2017 from https://web.archive.org/web/20000823144645/www.oadg.or.jp/activity/mncrs/mncrs0399.html, Mar. 1999, 13 pages.

"Ndiyo System", retrieved on Jan. 12, 2017 from https://web.archive.org/web/20060203024622/http://www.ndiyo.org/systems, Jan. 8, 2006, 4 pages.

"Wyse® Winterm 1 series, Based on Wyse Thin OS: User Guide", Issue 121906, Dec. 2006, 62 pages.

"Enterprise Network Computer Product Standard: Frontmatter", The Open Group, Document No. X98ND, retrieved on Jan. 12, 2017 from <http://www.opengroup.org/openbrand/prodstds/x98nd.htm>, Jan. 1999, 5 pages.

Davis, Jim, "Acorn Launches Fast Home NC", CNET News, retrieved on Jan. 12, 2017 from file:///U:/Documents/ClientMatters/0058%20%20Google/0058776001(Dan)[see%20754001]/USPTO/2017xxxx%20IDS/New/qTAM/index.html, Oct. 6, 1997, 3 pages.

eetimes.com, "First Network Computer Announced by IBM", retrieved on Jan. 12, 2017 from <http://www.eetimes.com/document.asp?doc_id=1209100>, Sep. 6, 1996, 3 pages.

Hodges et al., "Remoting Peripherals using Memory-Mapped Networks", retrieved from <http://www.cl.cam.ac.uk/research/dtg/attarchive/pub/docs/att/tr.98.7.pdf>, 1998, 3 pages.

Nguyen, C. Thi, "SCO's Tarantella to Host Applications on NT", retrieved on Jan. 12, 2017 from <http://windowsitpro.com/windows/sco-s-tarantella-host-applications-nt>, Jan. 11, 2000, 3 pages.

Ricciuti, Mike, "Oracle Down to Brass Tacks for NC", CNET News, retrieved on Jan. 12, 2017 from <https://www.cnet.com/news/oracle-down-to-brass-tacks-for-nc/>, Nov. 4, 1996, 3 pages.

Robischon, Noah, "Palm Foleo: A Laptop for Your Smartphone", Gizmodo.com, retrieved from <http://gizmodo.com/264550/palm-foleo-a-laptop-for-your-smartphone>, May 30, 2007, 25 pages.

Walsh, Jeff, "Jobs, Ellison Out of Sync on Mac NC Specs", Apple Prototype, retrieved on Jan. 12, 2017 from <https://web.archive.org/web/20000531132121/http://www.theapplecollection.com/design/macreleased/MacNC.html>, Dec. 1997, 2 pages.

* cited by examiner

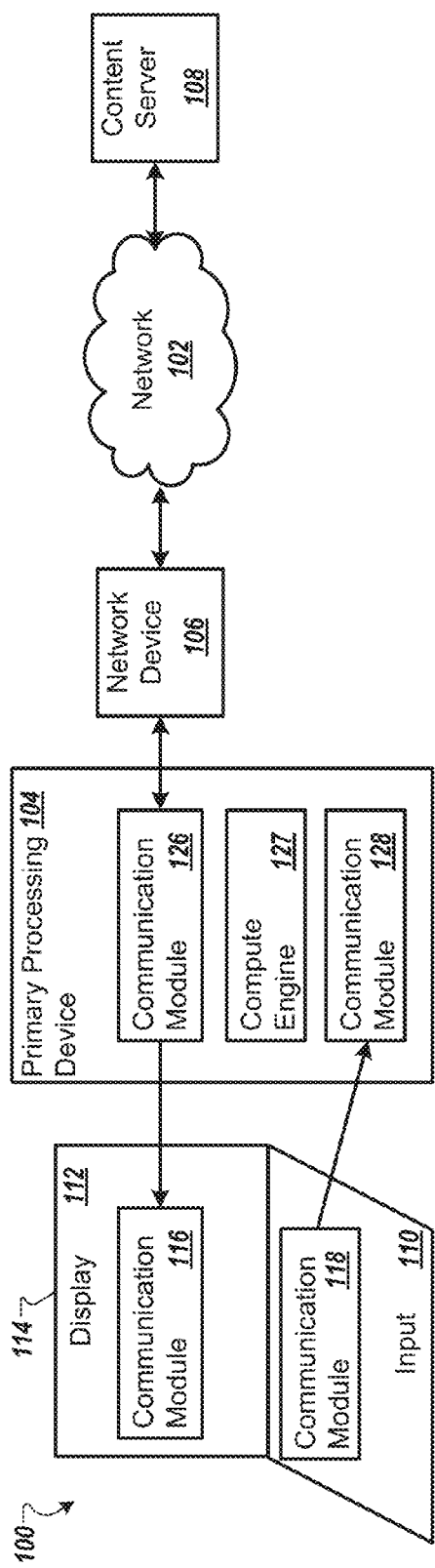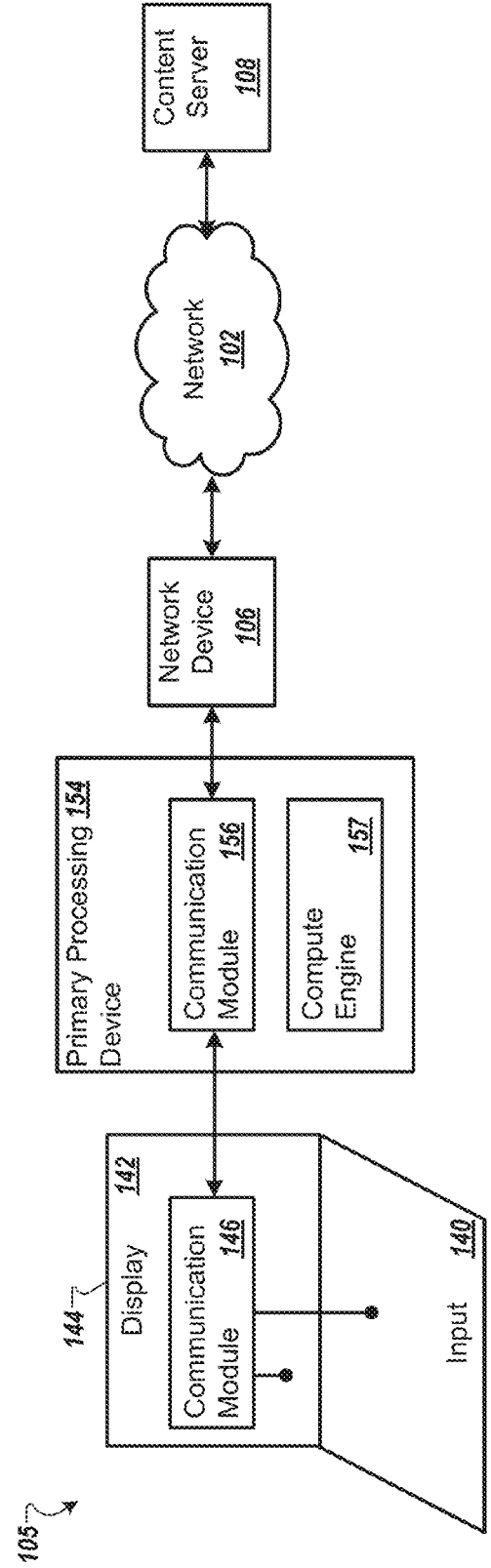

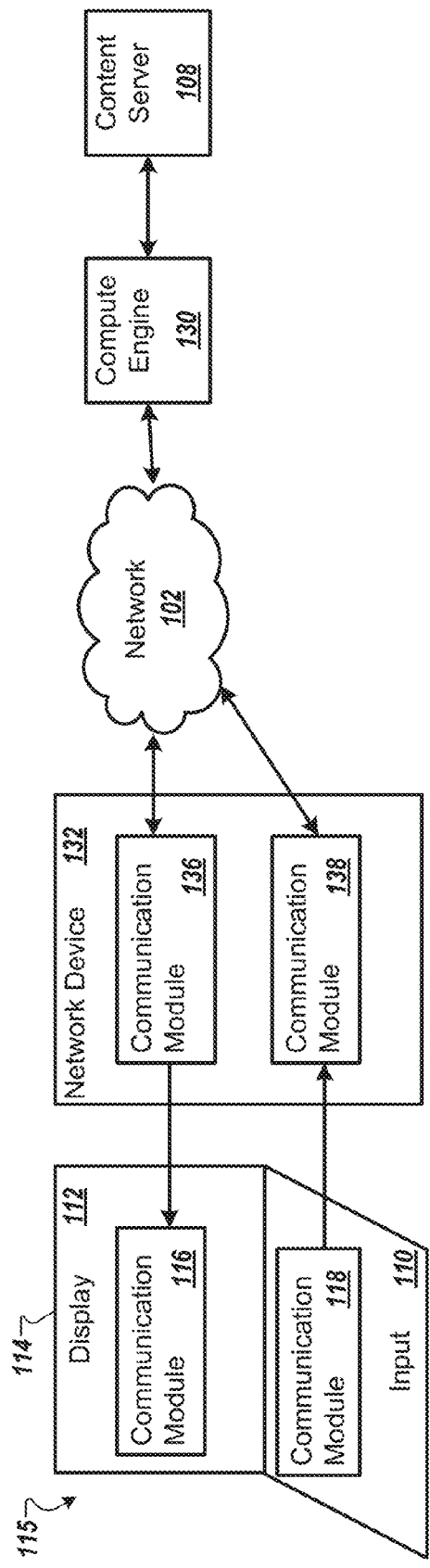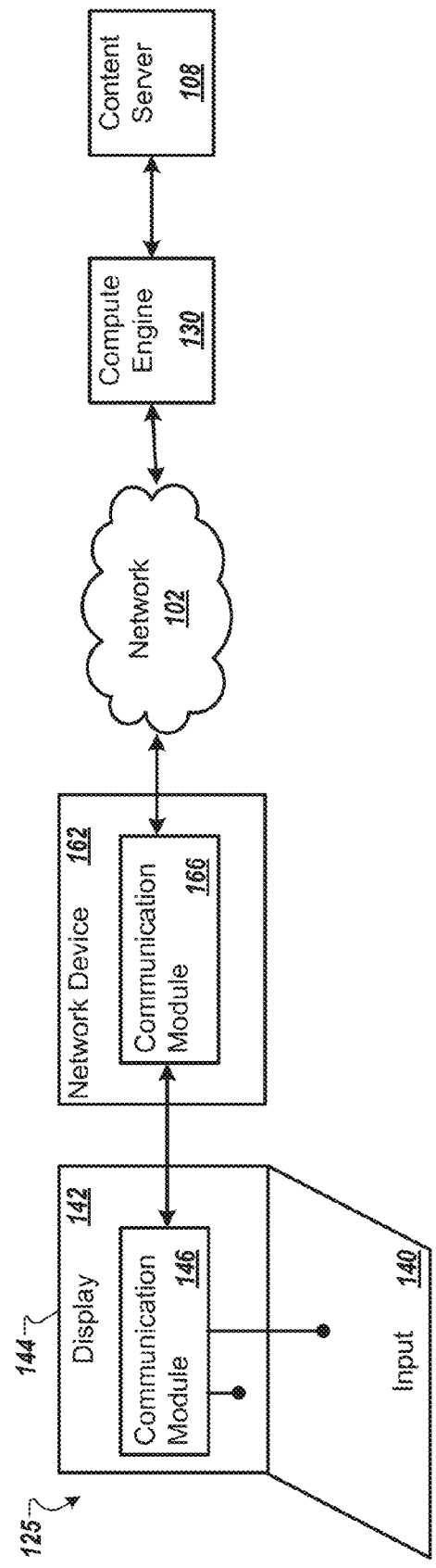
FIG. 1C
FIG. 1D

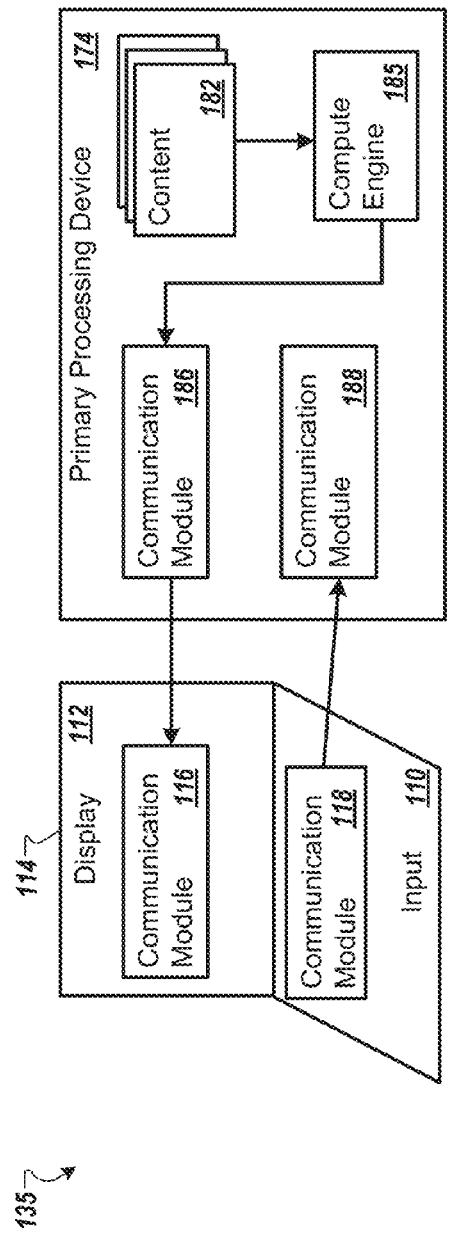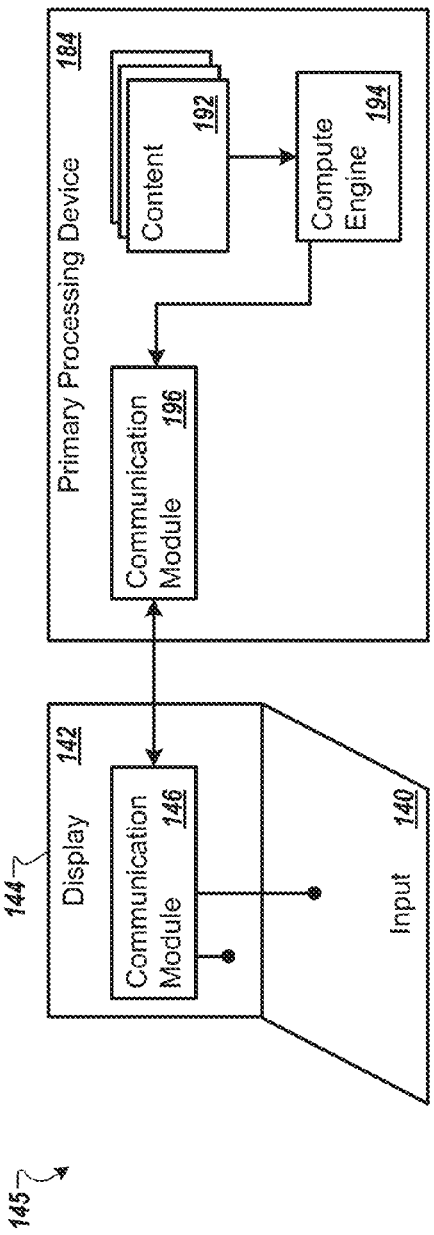

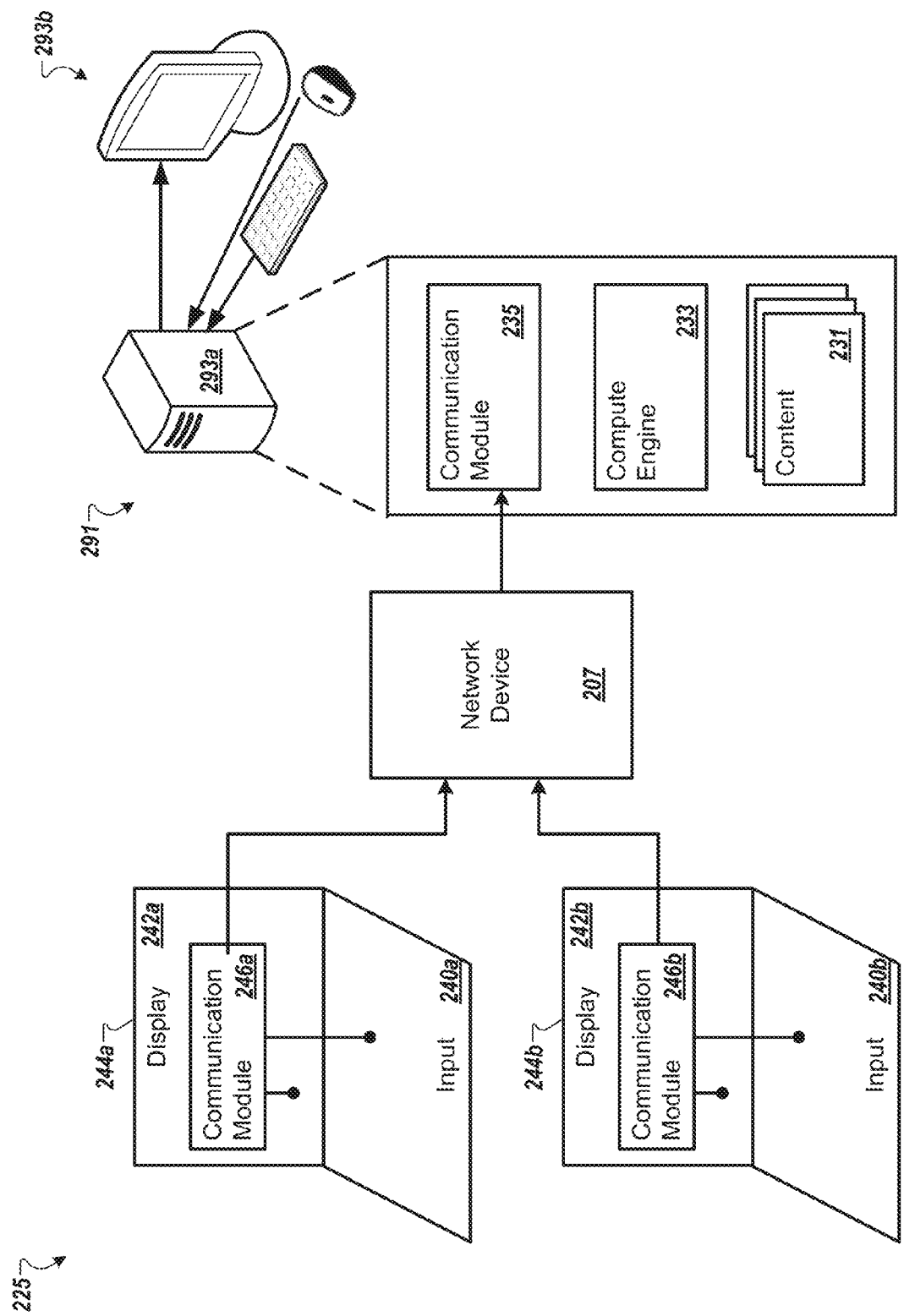

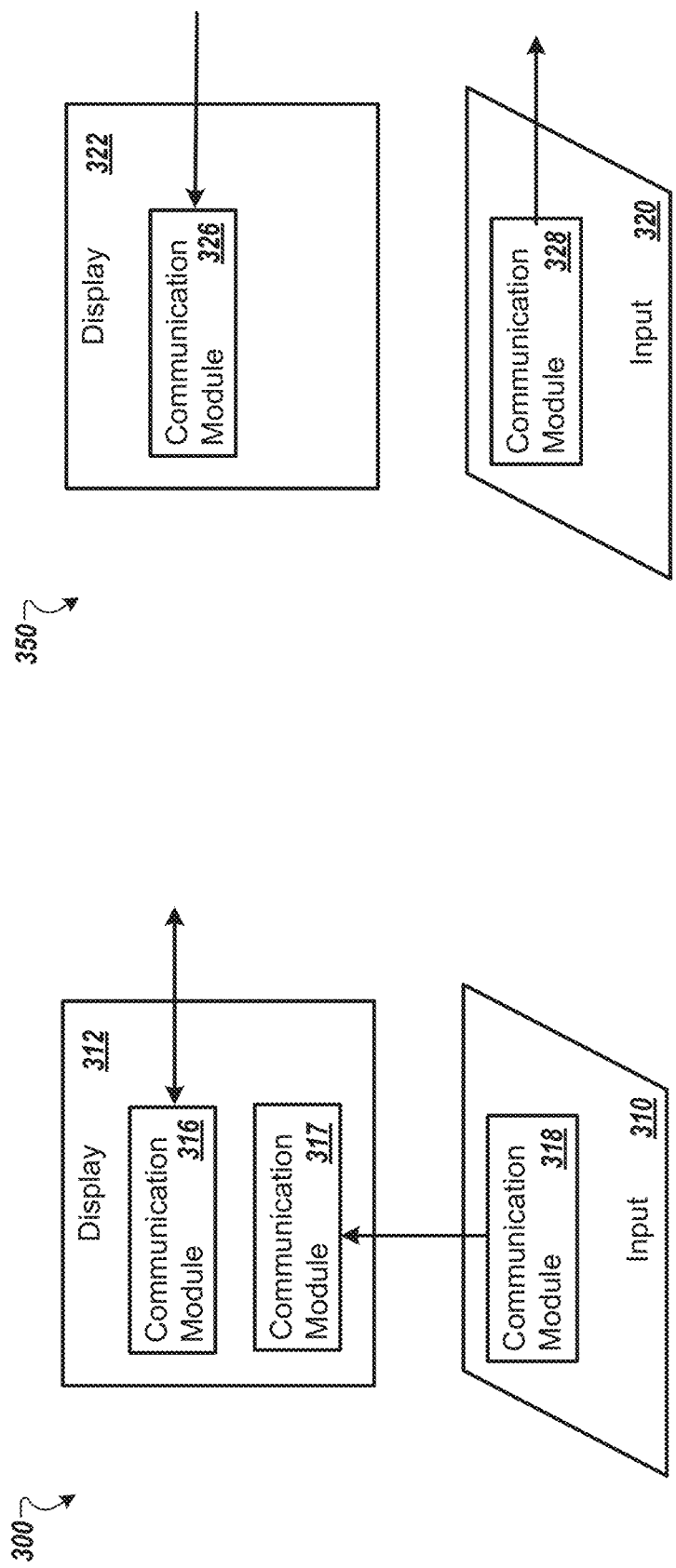

500

Transmit, by a first communication module included in a cast terminal and to a primary interface device, keystroke data over a first wireless network using a first wireless communication protocol, the keystroke data controlling an application interface associated with an application via processing performed at the cast terminal executing at the cast terminal.
502

Receive, by a second communication module included in the cast terminal and from the primary interface device, multimedia data over a second wireless network using a second wireless communication protocol, the multimedia data having been generated by the primary interface device from the received keystroke data.
504

MOBILE CAST RECEIVERS FOR COMPUTING AND ENTERTAINMENT DEVICES

TECHNICAL FIELD

This description generally relates to computing devices. The description, in particular, relates to the use of a minimized computing device for accessing and interacting with, for example, web content and other types of documents.

BACKGROUND

The inclusion of many storage devices, input devices, output devices, sensors and other types of hardware in a computing device can affect the overall cost and performance of the computing device. The amount and type of hardware and other components included in the computing device can determine the cost of the computing device. The increased computing power and increased battery power needed to operate the hardware and other components at a performance level acceptable to the user of the computing device can also contribute to the determination of the cost of the computing device. Eliminating (not including) much of the hardware and many of the components included in a computing device can limit its overall functionality but can also reduce the overall cost of the computing device and, in some cases, may increase the performance of the computing device for the specific needs of the user. In some cases, this may be beneficial to a user looking for a lower cost, minimized computing device directed towards a specific task where most of the functionality of a higher cost computing device may not be needed.

As such, there may be systems, methods, and apparatus that can provide other new and innovative features.

SUMMARY

In one general aspect, a computing system includes a cast terminal including a keyboard component and a display component physically coupled to the keyboard component, and a central computing device. The keyboard component includes a first communication module configured to transmit keystroke data over a first wireless network to the central computing device using a first wireless communication protocol. The display component includes a second communication module configured to receive multimedia data over a second wireless network from the central computing device using a second wireless communication protocol. The central computing device includes a third communication module configured to receive the keystroke data from the first wireless network, and a fourth communication module configured to transmit the multimedia data over the second wireless network.

Example implementations may include one or more of the following features. For instance, the central computing device can be included in a central computing system that includes at least one input device operatively coupled to the central computing device, and at least one output device each operatively coupled to the central computing device. The at least one output device can be a display device and the at least one input device can be a keyboard device. The keystroke data can control an application interface associated with an application executing in a compute engine on the central computing device, the application interface allowing the control of processing performed by the compute engine. The at least one input device can be a keyboard device. Input received by the central computing device and from the keyboard device can further control the application interface associated with the application. The central computing device can be configured to receive the keystroke data from the keyboard component over the first wireless network using the first wireless communication protocol, generate the multimedia data from the keystroke data, and transmit the multimedia data to the display component over the second wireless network using the second wireless communication protocol. The computing system can further include a network device can include a router, the router in communication with the central computing device using a third network including at least one of a wired network or a wireless network, and in communication with a server using a fourth network including at least one of a wired network or a wireless network, the server being configured to transmit the multimedia data to the central computing device by way of the router using the third and fourth networks. The second wireless communication protocol can be different from the first wireless communication protocol. The first wireless communication protocol can include at least one of Bluetooth and WiFi for communication via the first wireless network, and the second wireless communication protocol can include at least one of Bluetooth and WiFi for communication via the second wireless network. The cast terminal can be a first cast terminal, the keyboard component can be a first keyboard component, and the display component can be a first display component. The computing system can further include a second cast terminal including a second keyboard component and a second display component physically coupled to the second keyboard component. The second keyboard can include a fifth communication module configured to transmit keystroke data over a fifth wireless network to the central computing device using the first wireless communication protocol. The second display component can include a sixth communication module configured to receive multimedia data over the second wireless network from the central computing device using the second wireless communication protocol. The multimedia data transmitted by the central computing device and received by the first display component can be different from the multimedia data transmitted by the central computing device and received by the second display component. The central computing device can be included in a central computing system that includes at least one output device including a display device. The display device can display the multimedia data transmitted by the central computing device and received by the first display component and can display the different multimedia data transmitted by the central computing device and received by the second display component. The keystroke data can control an application interface associated with an application executing in a compute engine on the central computing device. The application interface can allow the control of processing performed by the compute engine. The central computing system can further include at least one input device. The central computing system can be configured to receive input from the at least one input device, and control the application interface based on the received input. Controlling the application interface can include one of displaying additional data along with the multimedia data and modifying the multimedia data. Modifying the multimedia data can include adding additional data to be included with the multimedia data. The multimedia data transmitted by the central computing device and received by the first display component can be the same as the multimedia data transmitted by the central computing device and received by the second display component. The keystroke data can include text related data. Generating the multimedia data from the keystroke data can include processing the text related data by converting the text related data into text image data. Transmitting the multimedia data to the display component over the second wireless network can include transmitting the text image data to the display component for displaying a text image representative of the text related data on the display component for viewing by a user. The keystroke data can include command related data. Generating the multimedia data from the keystroke data can include processing the command related data by converting the command related data into at least one instruction for causing the network device to perform a task. Transmitting the multimedia data to the display component over the second wireless network can include transmitting output data related to performing the task for displaying data representative of the output data on the display component for viewing by a user.

In another general aspect, a method for interacting with a cast terminal can include receiving, by the cast terminal and from an input component included in the cast terminal, input data, transmitting, by a first communication module included in the cast terminal and to a central computing device external from the cast terminal, the input data by way of a first wireless communication protocol, and receiving, by a second communication module included in the cast terminal and from the central computing device, multimedia data by way of a second wireless communication protocol, the multimedia data based on the received input data and based further on other input data received by the central computing device.

In yet another general aspect, a computing system can include a cast terminal including an input component including a first communication module and a display component including a second communication module, and a central computing device. The central computing device includes a third communication module, a fourth communication module, at least one input device, and at least one output device. The first communication module is configured to transmit input data received from the input component to the central computing device over a first wireless network using a first wireless communication protocol. The third communication module is configured to receive the input data from the first wireless network. The central computing device is configured to control an application interface associated with an application executing in a compute engine on the central computing device using the received input data. The application interface allows the control of processing performed by the compute engine. The fourth communication module is configured to transmit multimedia data from the compute engine to the cast terminal over a second wireless network using a second wireless communication protocol. The second communication module is configured to receive the multimedia data. The cast terminal is configured to display the multimedia data on the display component.

The details of one or more implementations are set forth in the accompanying drawings and the description below. Other features will be apparent from the description and drawings, and from the claims.

BRIEF DESCRIPTION OF THE DRAWINGS

FIG. 1A is a diagram that illustrates an example computing device for use in a system that includes a primary processing device and a network device.

FIG. 1B is a diagram that illustrates an example computing device that includes a single communication module for use in a system that includes a primary processing device and the network device.

FIG. 1C is a diagram that illustrates an example computing device for use in a system that includes a network device.

FIG. 1D is a diagram that illustrates an example computing that includes a single communication module for use in a system that includes a network device.

FIG. 1E is a diagram that illustrates an example computing device for use in a system that includes a primary processing device that includes content storage.

FIG. 1F is a diagram that illustrates an example computing that includes a single communication module for use in a system that includes a primary processing device that includes content storage.

FIG. 2G is a diagram of example computing devices for use in a system that includes a network device operatively coupled to each cast terminal and operatively coupled to a central computing device.

FIG. 3A is a diagram of example computing components for use in the systems disclosed herein.

FIG. 3B is a diagram of example alternative computing components for use in the systems disclosed herein.

FIG. 5 is a flowchart that illustrates a method for displaying content on a computing device.

Like reference symbols in the various drawings indicate like elements.

DETAILED DESCRIPTION

Figure 2A:
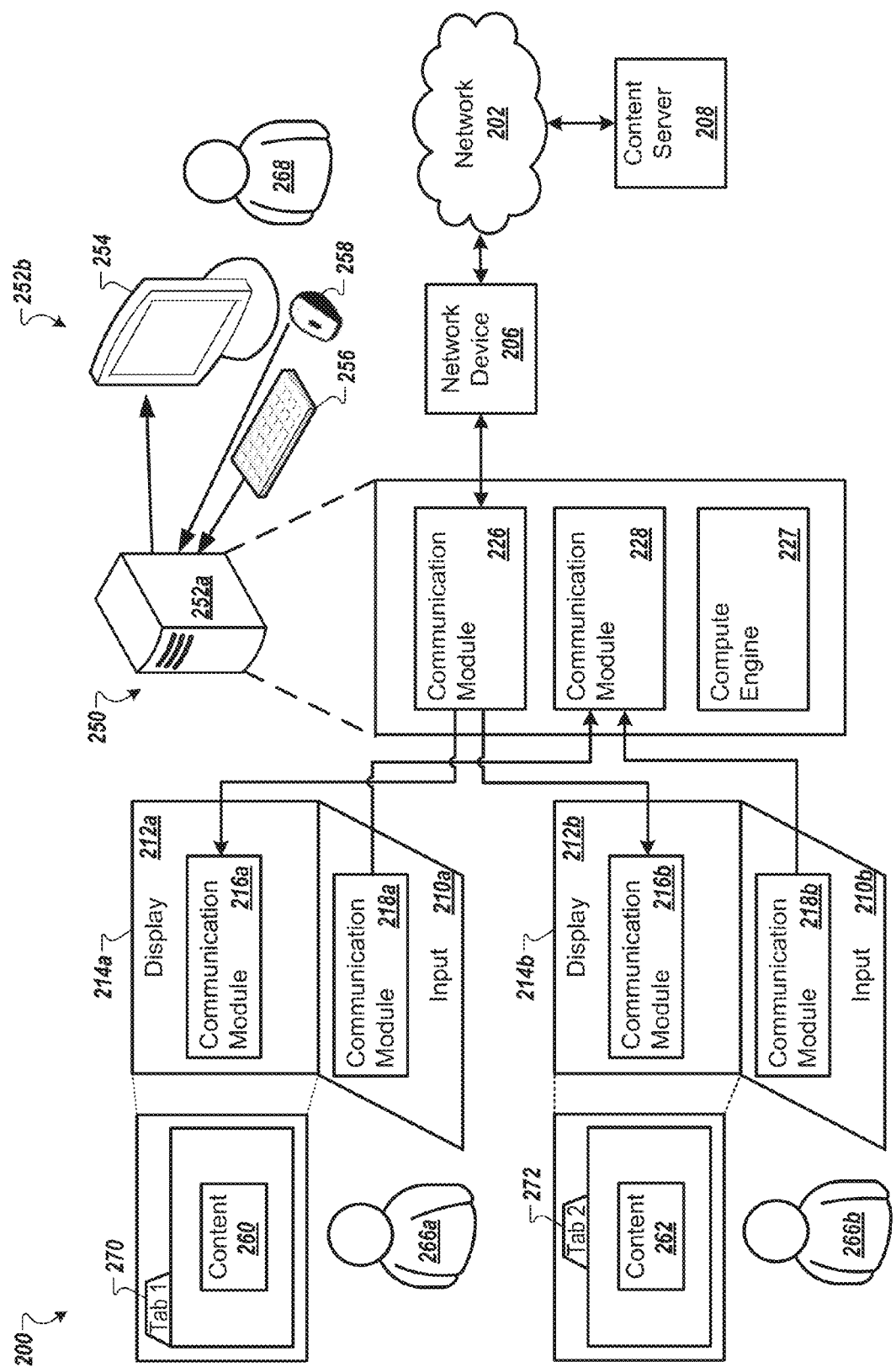
FIG. 2A is a diagram that illustrates example computing devices for use in a system that includes a central computing system and a network device.

In general, most computing devices can include hardware components for performing a vast array of tasks for a user. For example, a computing device can include many input and output devices and sensors to provide easy interaction of a user with the computing device. For example, a computing device can include input devices, such as a keyboard, a mouse, a trackpad, a touchpad, a pointing stick, one or more mouse buttons, a trackball, a joystick, a microphone, a touchscreen display (that can also provide visual output to the user), and a camera. For example, a computing device can include output devices such as one or more display devices (e.g., Liquid Crystal Displays (LCDs)), audio speakers, keyboard backlighting, auxiliary lighting, and other types of visual and audio output. In addition, the computing device can include many input and output sensors and/or systems, such as a Global Positioning System (GPS), one or more accelerometers, and a fingerprint scanner. The computing device can include one or more types of storage devices, such as a hard disk drive (which may be a solid-state drive or a mechanical disk drive), and one or more types of random access memory (RAM). The computing device can include hardware enabling one or more types of communication interfaces such as WiFi, Bluetooth, Ethernet, etc. The computing device can include hardware enabling connectivity to the computing device, such as one or more types of Universal Serial Bus (USB) connections. The computing device also includes a battery that is capable of providing the power needed by the computing device to operate the hardware included in the computing device. In some cases, the computing device can be powered from an AC power source. In general, the laptop computing device can include a motherboard and numerous other peripheral components that provide a user with many beneficial functions and interfaces.

In some implementations, the input devices and output devices can be integrated with the computing device. In other implementations, some of the input devices and some of the output devices can be integrated with the computing device and others may be external components that interface to the computing device.

A cast terminal can include a display component integrated with an input component housed in an enclosure. The cast terminal can include a display device as an output device that is included in the display component. The cast terminal can include one or more speakers as additional output devices. The cast terminal can include a keyboard component an as input device along with a trackpad and/or touchpad that are included in the input component. The cast terminal can include hardware needed to interface with the display device, the one or more speakers, the keyboard component, and the trackpad and/or touchpad. The cast terminal can communicate with an external device using one or more types of wireless communication protocols (e.g., WiFi, Bluetooth). The cast terminal can include hardware components for implementing the communication interfaces. The cast terminal can include electrical components needed to operate the hardware on the device. The cast terminal includes a battery.

Compared to a more traditional type of computing device as described above (one that includes storage devices, and many other additional input devices and output devices, as well as sensors), this type of computing device (a cast terminal) can be considered a type of stateless laptop computing device (and can also be referred to as a minimized laptop computing device) because the cast terminal does not include (excludes) a central processing unit (CPU). This cast terminal can cost much less that a more traditional type of computing device as it includes fewer components and features.

The cast terminal, however, can use its wireless communication capabilities to be connected to/interfaced with another computing device that can include a CPU that can act as a CPU for the cast terminal. For example, the other computing device can execute applications whose user interface and/or output can be displayed on a display device included in a display component of the cast terminal. The other computing device can receive input from the keyboard component of the cast terminal and provide output to the display component of the cast terminal for display on the display device. The cast terminal can provide an input component (a keyboard) and an output component (a display device, a speaker) that the other computing device it is in communication with may be lacking. The cast terminal can rely on the other computing device (e.g., a smartphone, a remote computer on a network, a remote computer in the cloud) to act as its CPU in order to manage incoming data, and process information, and output data (e.g., video data, audio data).

In some implementations, the cast terminal may extend/augment/enhance the functionality of another computing device that it is communicatively coupled to by providing an input component (e.g., a full mechanical keyboard) that enhances the user experience with the other computing device (e.g., the other computing device utilizes an on-screen keypad). In addition or in the alternative, the cast terminal may extend/augment/enhance the functionality of the other computing device by providing an output component (e.g., a large high resolution LCD display, one or more audio (stereo) speakers) that enhances the user experience with the other computing device (e.g., the other computing device utilizes a small low-resolution display).

In some implementations, the cast terminal is connected to the other computing device. In some implementations, the other computing device can be a mobile computing device, a tablet, a notebook computer, a laptop computer, a desktop computer or a server. In some cases, the server may be local to the cast terminal, remote from the cast terminal, or resident in the cloud. In some cases, more than one cast terminal may be connected to the other computing device. In these implementations, the other computing device may act as a central computing device where coordination and monitoring of the content provided to each cast terminal can take place. The central computing device can provide each cast terminal with access to a network and/or the internet.

A user can send content (e.g., video, documents) from the other computing device to the cast terminal. The user can control the content sent from the other computing device to the cast terminal by interacting with the input device(s) provided by the cast terminal. For example, an application running on the other computing device can use a casting API to communicate with a receiver application running on the cast terminal. The content from the other computing device can be sent to the cast terminal for video playback by the receiver application and to a display included in the cast terminal.

Even if the other computing device provides input and output capabilities to a user of the device, the cast terminal may provide far better and more user desirable input and output capabilities while providing additional functionality to the user of the cast terminal, such as access to a network and/or the internet.

For example, a user may connect a cast terminal to a mobile computing device (e.g., a smartphone, a tablet). The cast terminal can provide the user with a full keyboard interface and a display device that is much larger than the display of the mobile device while the mobile computing device can interface with/connect to networks and the internet. The mobile computing device can provide access to applications and content included on the mobile computing device or on a network or, in some cases, in the cloud.

In another example, a user may communicatively connect a cast terminal to a central computing device (e.g., a desktop computer (that includes a keyboard, mouse, and a display), a conventional laptop computer). The cast terminal can act as a cast terminal while the central computing device can interface with/connect to networks and the internet. The central computing device can provide access to applications and content included on the central computing device or on a network or, in some cases, in the cloud. In addition, a user of the central computing device can monitor and/or provide content to all or, in some cases, just some of the cast terminals connected to the central computing device.

FIG. 1A is a diagram that illustrates an example computing device (e.g., cast terminal 114) for use in a system 100 that includes a primary processing device 104 and a network device 106.

In some implementations, the primary processing device 104 can be a mobile device (e.g., a smart phone, a tablet, a notebook, a personal digital assistant (PDA)). In some cases, the primary processing device 104 (e.g., a smart phone) can have computing power equivalent to, if not better than, many low-end laptop computing devices. However, the primary processing device 104 may not include a mechanical keyboard. The keyboard may be a virtual keyboard that is displayed on the display of the primary processing device 104 along with any information or data. Since the display of the primary processing device 104 may be small, having to display both a virtual keyboard and the information can make it for difficult for a user of the primary processing device 104 to read the information and to interact with the virtual keyboard.

The cast terminal 114 can utilize the computing power of the primary processing device 104 while providing a larger, separate keyboard for entry of input by a user and a larger separate display device that can display information and data to the user that can be more easily read by the user. The cast terminal 114 can provide a more enjoyable (and in some cases more productive) experience for the user without the user needing to obtain another complete computing device. The cast terminal 114 can provide a user with a more positive experience for providing input to and receiving output from applications running on the primary processing device 104 and, in some cases, from web-based or cloud-based applications that the primary processing device 104 can interface with. In some cases, the cast terminal 114 can mirror content provided by the applications.

An input component 110 includes a first communication module 118 capable of unidirectional and/or bidirectional communication. The first communication module 118 transmits keystroke data from the keyboard component to a third communication module 128 included in the primary processing device 104. The first communication module 118 can also transmit trackpad data (e.g., a coordinate) from the trackpad to the third communication module 128 included in the primary processing device 104.

In some implementations, the input component 110 can include a pointing device (e.g., a mouse). The first communication module 118 can transmit data from the pointing device to a third communication module 128 included in the primary processing device 104. In some implementations, the input component 110 may allow one or more external devices (devices external to the cast terminal 114 and the primary processing device 104) to be connected to/interfaced with the cast terminal 114 using the first communication module 118. In these implementations, the first communication module 118 may communicate unidirectionally and/or bidirectionally with the external device. For example, a user may connect/plug-in an external input device (e.g., a mouse) to the cast terminal 114.

In some implementations, the display component 112 may allow one or more external devices (devices external to the cast terminal 114 and the primary processing device 104) to be connected to/interfaced with the cast terminal 114 using a second communication module 116. In these implementations, a second communication module 116 may communicate unidirectionally and/or bidirectionally with the external device. For example, a user may connect/plug-in an external output device (e.g., wireless speakers) to the cast terminal 114.

In some implementations, the cast terminal 114 may include another communication module (e.g., a universal serial bus (USB) connection) in the display component 112 and/or the input component 110. The other communication module can allow a user of the cast terminal 114 to connect an external device (e.g., an external removable storage device (e.g., a flash drive), external speakers, a mouse) to the cast terminal 114.

The display component 112 can include a display device (e.g., an LCD, a light emitting diode (LED) display, or plasma display) and the second communication module 116. The second communication module 116 is capable of unidirectional and/or bidirectional communication. The second communication module 116 can receive audio and/or video data (e.g., streaming video data) from a fourth communication module 126 included in the primary processing device 104. The received video data can be encoded in a format that can be decoded by, for example, a System on a Chip (SoC) included in the display component 112. The SoC can include codecs for hardware decoding of one or more video compression formats (e.g., V8, H.264/MPEG-4 Advanced Video Coding (AVC)). The decoded video data can be converted into signals needed to drive the display device. For example, a low-voltage differential signaling (LVDS) LCD-panel interface can provide received streaming video to an LCD-panel timing controller included in an LCD device. In addition, the decoded video data can be converted into signals that can be provided to an audio output device (a speaker).

The primary processing device 104 can communicate wirelessly using at least one type of wireless interface. Types of wireless interfaces can include, but are not limited to, WiFi (IEEE 802.11), Bluetooth, Bluetooth Low Energy (LE), and wireless infrared communications (IrDA). The type of wireless interface used can be based on a proximity of the cast terminal 114 to the primary processing device 104. The primary processing device 104 can also communicate with the network device 106. The network device 106 can be capable of communications with the primary processing device 104 and a network 102. For example, the network device 106 can be a router, a cable modem, a digital subscriber loop (DSL) modem or other type of modem. The network device 106 may also be a combination of one or more devices that allow the primary processing device 104 access to a computer network (e.g., the network 102) such as the Internet.

In some implementations, the network device 106 may be included as part of the primary processing device 104. For example, the primary processing device 104 may be a mobile phone that accesses a cellular telecommunications network (e.g., the network 102), where the network device 106 enables connection of the primary processing device 104 to the cellular network.

The primary processing device 104 can access a content server 108 to obtain content requested by a user of the cast terminal 114. For example, a compute engine 127 included in the primary processing device 104 can receive keystroke data (and other input data) sent by the first communication module 118 included in the cast terminal 114 to the third communication module 128 included in the primary processing device 104. The compute engine 127 can interpret the keystroke data to identify content requested by a user of the cast terminal 114. The primary processing device 104 can communicate the request for the content to the content server 108 using the fourth communication module 126 and the network device 106 by way of the network 102. In some implementations, the primary processing device 104 may include an additional communication module for communicating with the network device 106. In some implementations, the primary processing device 104 may include a single communication module that may be used to communicate with the first communication module 118, the second communication module 116, and the network device 106.

The content server 108 can provide the requested content to the primary processing device 104, and specifically to the compute engine 127. In some implementations, the compute engine 127 can be included as part of (or may host) a casting enabled application resident on the primary processing device 104. The compute engine 127 can receive the input data and the content and can further provide the content to the fourth communication module 126 for transmitting to the second communication module 116 included in the cast terminal 114.

In some implementations, the compute engine 127 can be included as part of a web browser application resident on the primary processing device 104 that can provide or "cast" a tab or page of the web browser application to the cast terminal 104. For example, a casting application program interface (API) (e.g., Web Real-Time Communication (WebRTC), Miracast) can be used for browser-based real-time communications. A user of the cast terminal 114 can interact with the casted tab of the web-browser application (e.g., they can provide input to and view output in the casted tab using the cast terminal 114 as described herein).

In a non-limiting example, referring to FIG. 1A, a user of the cast terminal 114 would like to write and edit a paper about how to build a spaghetti bridge. The user can interact with a document editing application executing on the primary processing device 104 while viewing the content of the document on the display device of the display component 112. The user may be a student in a science class and a teacher gave the student the assignment. The cast terminal 114 can display an interface on the display device included in the display component 112 that allows the user to view the document, and enter information and data for the document. A "view" of the document can be a video image of the document, provided by the primary processing device 104 to the display component 112, as it is being edited. The user can enter the information using one or more of the input devices included in the input component 110. For example, the primary processing device 104 can cast a tab of a web-browser application running on the primary processing device 104 to the display device included in the display component 112 of the cast terminal 114. In another example, the primary processing device 104 may include (or otherwise have access to) a cast-enabled application. The user can use a keyboard included in the input component 110 to enter the name of the document they would like to edit. For example, the document may be stored locally on the primary processing device 104. In another example, the document may be stored on a server communicatively coupled to the network 102.

The user can also use input devices included in the input component 110 (or external devices connected to the input component 110) to edit and otherwise manipulate the document information and data by interfacing with the cast-enabled application (or the cast of the tab of the web-browser application). In some cases, the user can store the document in memory included in the primary processing device. In other cases, the user may connect an external storage device (e.g., a flash drive) to the cast terminal 114. The user can then store the document on the external storage device.

In some cases, the primary processing device 104 can be a mobile computing device (e.g., a mobile phone) that belongs to the user. For example, the user (e.g., a student) can sit at a desk, place the cast terminal 114 on the desk, and place the mobile phone on the desk (or keep the mobile phone in a pocket or in a bag near or under the desk). The cast terminal 114 can communicate with the mobile phone using one or more types of wireless communication protocols (e.g., WiFi, Bluetooth, Bluetooth LE, and IrDA). The wireless communication protocols can include those that may require close proximity of the cast terminal 114 to the primary processing device 104.

The first communication module 118 transmits the keystroke data to the third communication module 128. The compute engine 127 interprets the keystroke data and uses the fourth communication module 126 to request content from the content server 108 using the network device 106 by way of the network 102. The content server 108 provides the requested content to the primary processing device 104 by way of the network 102 and network device 106. In the example web-browser application, the content provided by the content server 108 may include one or more indications of videos available on the internet for viewing (e.g., the indications may be links to web sites that include a video). In the example video sharing application, the content provided by the content server 108 may be indications of one or more videos available for viewing with the video sharing application (e.g., the indications may be links to videos hosted by the video sharing application).

In some implementations, the fourth communication module 126 transmits the content provided by the content server 108 as a compressed video signal to the second communication module 116. The cast terminal 114 decodes and displays the compressed video signal (e.g., in effect a "screenshot" or captured image of the content provided by the content server 108) on the display device. In some implementations, the fourth communication module 126 can transcode the content provided by the content server 108. The fourth communication module 126 can provide the decoded signal to the second communication module 116. The cast terminal 114 displays the decompressed video signal (e.g., in effect a "screenshot" or captured image of the content provided by the content server 108) on the display device.

The user can use a keyboard and/or a trackpad (touchpad) included in the input component 110 to select the video they would like to view. For example, the keystrokes and/or trackpad and/or touchpad output can be transmitted to the third communication module 128 from the first communication module 118 included in the input component 110, to effectively move a selection indicator (e.g., a cursor) from one item to another within the content displayed on the display device. The movement can be performed by the compute engine 127 interpreting the received input, regenerating the content with the updated location of the selection indicator, and generating a compressed video image of the displayed content for subsequent transmission from the fourth communication module 126 to the second communication modules. Once received, the cast terminal 114 decodes the video signal for display on the display device. This operation can be performed essentially in "real time" providing the expected response to a user of the cast terminal 114.

Once the user selects the video that they would like to view and the compute engine 127 receives and interprets the input data, the compute engine 127 uses the fourth communication module 126 to request the content (e.g., the streaming video data) from the content server 108 by way of the network 102 using the network device 106. The content server 108 provides the requested content (e.g., the streaming video data) to the primary processing device 104 by way of the network 102 and network device 106. In the example web-browser application, the tab of a web-browser application casted to the display device provides the streaming video data to the display device. In the example video sharing application, the video sharing application provides the streaming video data to the display device. In both examples, the streaming video data is transmitted from the fourth communication module 126 included in the primary processing device 104 to the second communication module 116 included in the display component 112. A SoC included in the display component can decode the streaming video data in real-time, converting the streaming video data into signals used to drive the display device and one or more speakers. The user can now listen to and view a video on how to make a spaghetti bridge.

FIG. 1B is a diagram that illustrates an example computing device (e.g., cast terminal 144) that includes a first single communication module 146 for use in a system 105 that includes a primary processing device 154 and the network device 106.

Referring to FIG. 1A, in some implementations, the cast terminal 144 and the primary processing device 154 can be communicatively coupled to the network device 106 along with the cast terminal 114 and primary processing device 104. In other implementations, the cast terminal 144 and primary processing device 154 can be communicatively coupled to the network device 106 instead of (replacing) the cast terminal 114 and primary processing device 104.

The cast terminal 144 functions in a similar manner to the cast terminal 114. The cast terminal 144 includes an input component 140 that functions in a similar manner to the input component 110. A display component 142 included in the cast terminal 144 functions in a similar manner to the display component 112. The cast terminal 144 includes a first single communication module 146 that is communicatively coupled to a second single communication module 156 included in the primary processing device 154. The first single communication module 146 transmits input data from the input component 110 to the second single communication module 156 included in the primary processing device 154. The first single communication module 146 receives content (e.g., video and/or audio data) transmitted by the second single communication module 156 included in the primary processing device 154. A compute engine 157 included in the primary processing device 154 functions in a similar manner to the compute engine 127. The primary processing device 154 obtains the content in a similar manner as the primary processing device 104.

The cast terminal 144 and the primary processing device 154 each include a single communication module (first single communication module 146 and second single communication module 156) capable of bidirectional communication. The second single communication module 156 is capable of bidirectional communication with both the cast terminal 144 and the network device 106. Though the first single communication module 146 is shown as being located in the display component 142, in some implementations, the first single communication module 146 may be included in the input component 140. FIG. 1C is a diagram that illustrates an example computing device (e.g., cast terminal 114) for use in a system 115 that includes a network device 132. As compared to the system 100 as shown in FIG. 1A, the system 115 does not include a primary processing device (e.g., the primary processing device 104). In addition, the network device 132 can access a compute engine 130 by way of the network 102. In some implementations, the compute engine 130 can be resident in the cloud and can access the content server 108, which may also be resident in the cloud. In some implementations, the compute engine 130 may be included in (be part of) the content server 108.

In the system 115, the network device 132 includes a third communication module 138 and a fourth communication module 136. The third communication module 138 and the fourth communication module 136 can function similar to the third communication module 128 and the fourth communication module 126 included in the primary processing device 104 in the system 100 shown in FIG. 1A. The third communication module 138 and the fourth communication module 136 can communicate with the network 102.

The first communication module 118 can transmit input data from the input component 110 (e.g., keystroke data from a keyboard, data from a trackpad/touchpad) to the third communication module 138 included in the network device 132.

The second communication module 116 can receive audio and/or video data (e.g., streaming video data) from a fourth communication module 136 included in the network device 132. The received video data can be displayed on a display device included in the display component 112 of the cast terminal 114 as previously described herein.

The network device 132 is capable of communications with the cast terminal 114 and the network 102. For example, the network device 132 can include, along with the third communication module 138 and the fourth communication module 136, a router, a cable modem, a digital subscriber loop (DSL) modem or other type of modem.

In some implementations, the network device 132 can provide the cast terminal 114 access to a computer network (e.g., the network 102) such as the internet. In addition, the network device 132, by way of the network 102, can provide the cast terminal 114 access to one or more cloud computing systems. For example, the compute engine 130 may host (or be part of) a web-based application running in the cloud. The compute engine 130 can receive input data from the network device 132 by way of the network 102. The input data is the data received by the third communication module 138 included in the network device 132 and from the first communication module 118 included in the input component 110 of the cast terminal 114.

In another example, the compute engine 130 can host (be part of) a web browser application resident on a server accessible by the network 102. In another example, the compute engine 130 can host (be part of) a web browser application based in the cloud and accessible by the network 102. The compute engine 130 can provide or "cast" a tab or page of the server/cloud based web browser application to the cast terminal 114. For example, a casting application program interface (API) can be used for browser-based real-time communications. A user of the cast terminal 114 can interact with the casted tab of the web-browser application (e.g., they can provide input to and view output in the casted tab using the cast terminal 114 as described herein).

The compute engine 130 can interpret the received input data to identify content requested by a user of the cast terminal 114. The compute engine 130 can access the content server 108 to obtain the requested content. The compute engine 130 can further provide the content to the fourth communication module 136 by way of the network 102 for transmitting to the second communication module 116 included in the cast terminal 114. The compute engine 130 provides the content to the cast terminal 114 in a similar manner as that described with reference to FIG. 1A.

In some implementations, the network device 132 may include an additional communication module for communicating with the network 102. For example, the network device 132 may communicate using wireless communication interfaces with the cast terminal 114 and may communicate over a wired network connection to the network 102. In some implementations, the network device 132 may include a single communication module that may be used to communicate with the first communication module 118, the second communication module 116 and the network 102.

FIG. 1D is a diagram that illustrates an example computing device (e.g., cast terminal 144) that includes a first single communication module 146 for use in a system 125 that includes a network device 162.

Referring to FIG. 1C, in some implementations, the cast terminal 144 and network device 162 can be communicatively coupled to the network 102 along with the cast terminal 114 and network device 132. In other implementations, the cast terminal 144 and network device 162 can be communicatively coupled to the network 102 instead of (replacing) the cast terminal 114 and network device 132.

The cast terminal 144 can function in a manner similar to the cast terminal 114. The cast terminal 144 includes the first single communication module 146 that is communicatively coupled to a second single communication module 166 included in the network device 162. The first single communication module 146 transmits input data from the input component 110 to the second single communication module 166 included in the network device 162. The first single communication module 146 receives content (e.g., video and/or audio data) transmitted by the second single communication module 166 included in the network device 162. The network device 162 interacts with/interfaces with/communicates with the network 102, the compute engine 130 by way of the network 102, and the cast terminal 144 in a manner similar to that of the network device 132.

The cast terminal 144 and the network device 162 each include a single communication module (first single communication module 146 and second single communication module 166) capable of bidirectional communication.

FIG. 1E is a diagram that illustrates an example computing device (e.g., the cast terminal 114) for use in a system 135 that includes a primary processing device 174 that includes content storage 182.

As described with reference to FIG. 1A, in some implementations, the primary processing device 174 can be a mobile device that can have computing power equivalent to, if not better than, many low-end cast terminals. In addition, for example, the content storage 182 can include content (e.g., files) stored locally on the primary processing device 174. The content can include, but is not limited to, video files, music files, and document files.

The cast terminal 114 can utilize the computing power of the primary processing device 174 and can access the content included in the content storage 182 included on the primary processing device 174. The input component 110 includes the first communication module 118. The first communication module 118 transmits keystroke data from a keyboard component included in the input component 110 to a third communication module 188 included in the primary processing device 174. The first communication module 118 can also transmit trackpad/touchpad data (e.g., a coordinate) from a trackpad/touchpad included in the input component 110 to the third communication module 188 included in the primary processing device 174.

The display component 112 can include a display device and the second communication module 116. The second communication module 116 can receive audio and/or video data (e.g., streaming video data) from a fourth communication module 186 included in the primary processing device 174. The primary processing device 174 can communicate with the cast terminal 114 wirelessly using at least one type of wireless interface.

A user of the cast terminal 114 can request content (e.g., one or more files) stored in the content storage 182. The primary processing device 174 can provide the requested content to a compute engine 185. For example, the compute engine 185 can be included as part of (or may host) a casting enabled application resident on the primary processing device 174 that can receive input data from the third communication module 188 and content from the content storage 182. The compute engine 185 can provide the content from the content storage 182 to the fourth communication module 186 for transmitting to the second communication module 116 included in the cast terminal 114. The content can be displayed on a display device included in the display component 112 as discussed herein.

In some implementations, the compute engine 185 can be included as part of a web browser application resident on the primary processing device 174. The web browser application can provide or "cast" a tab or page of the web browser application. The web browser application can display/provide content included in the content storage 182 in the tab or page of the web browser application. For example, a casting API can be used for browser-based real-time communications. A user of the cast terminal 114 can interact with the casted tab of the web-browser application (e.g., they can provide input to and view output in the casted tab using the cast terminal 114 as described herein).

In a non-limiting example, the primary processing device 174 can be a mobile phone that includes a camera capable of recording short videos. A user of the primary processing device (a student) can record a video of how they constructed a spaghetti bridge. The video may be part of a class project. The cast terminal 114 may be available in the classroom for use by the student. When the student arrives in class, the student can connect/interface/communicatively couple the cast terminal 114 to the primary processing device 174 (e.g., the mobile phone) as described herein. The student can use the cast terminal 114, specifically a keyboard component included in the input component, to request the playing of the spaghetti bridge-building video (e.g., content stored in the content storage 182). The compute engine 185, either using a casting enabled application resident on the primary processing device 174 or by providing or casting a tab or page of a web browser application resident on the primary processing device 174, can stream the video content to the cast terminal 114 using any of the processes described herein. The video may then be viewed by the student, the teacher and other students on the display included in the display component 112 of the cast terminal 114.

FIG. 1F is a diagram that illustrates an example computing device (e.g., cast terminal 144) that includes a first single communication module 146 for use in a system 145 that includes a primary processing device 184 that includes content storage 192.

As described with reference to FIG. 1E, in some implementations, the primary processing device 184 can be a mobile device that can have computing power equivalent to, if not better than, many low-end cast terminals. In addition, for example, the content storage 192 can include content (e.g., files) stored locally on the primary processing device 184. The content can include, but is not limited to, video files, music files, and document files.

The cast terminal 114 can utilize the computing power of the primary processing device 184 and can access the content included in the content storage 192 included on the primary processing device 184. The cast terminal 144 functions in a manner similar to the cast terminal 114. The cast terminal 144 includes the first single communication module 146 that is communicatively coupled to a second single communication module 196 included in the primary processing device 184. The first single communication module 146 transmits input data from the input component 110 to the second single communication module 196 included in the primary processing device 184. The first single communication module 146 receives content (e.g., video and/or audio data) transmitted by the second single communication module 196. The content storage 192 provides the requested content to the compute engine 130 in a manner similar to that described in FIG. 1E with reference to the compute engine 185 and the content storage 182.

The cast terminal 144 and the primary processing device 184 each include a single communication module (first single communication module 146 and second single communication module 196) capable of bidirectional communication.

FIG. 2A is a diagram that illustrates example computing devices (e.g., cast terminals 214*a-b*) for use in a system 200 that includes a central computing system 250 and a network device 206. The central computing system 250 includes a central computing device 252*a*, and input/output (I/O) devices 252*b*. The I/O devices 252*b* can include, but are not limited to, a display device 254, a keyboard 256 and a mouse 258. Though not shown, the I/O devices 252*b* can also include a trackpad, a touchpad, a joy stick, a pointing device, and other types of input devices. Though not shown, the I/O devices 252*b* can also include one or more speakers or other types of output devices. In some implementations, the display device 254 can be a touchscreen that provides input as well as displaying output.

FIG. 2A shows two cast terminals 214*a-b*, however, some systems may include a single cast terminal and other systems may include more than two cast terminals.

The determination of a number of cast terminals to include in the system 200 (or similar systems described herein) can be based on the computing power of the central computing system 250. In addition, or in the alternative, the determination of a number of cast terminals to include in the system 200 (or similar systems described herein) can be based on the content that can be provided to the cast terminals. For example, in cases where the content is limited to text files, a greater number of cast terminals may be included in a system in contrast to cases where the content may primarily include high definition streaming video data. This is because the computing power a central computing device (e.g., the central computing device 252*a*) may need in order to provide text files may be much less than the computing power needed to provide streaming video data. This is because the compression of the text files is better than the compression of the video data files.

In addition, or in the alternative, the needs of the environment where a system is placed may determine a number of cast terminals to include in the system. For example, in a classroom environment, a cast terminal may be allocated for each student in the class (e.g., ten students in the class—ten cast terminals). In another example, a cast terminal may be allocated for groups of students in the class (e.g., one cast terminal is shared between two students—in a class with ten students there would be five cast terminals). In some cases, not all of the available cast terminals that can connect to/interface with a central computing system may actually be accessing content using the central computing system at the same time. This can result in overall improved system performance.

Each of the cast terminals 214*a-b* function in a manner similar to the cast terminal 114 as described, for example, in FIG. 1A. The cast terminals 214*a-b* include input components 210*a-b* and display components 212*a-b*, respectively. A first communication module 218*a* transmits keystroke data from a keyboard component included in the input component 210*a* to a third communication module 228 included in the central computing device 252*a*. In addition, or in the alternative, the first communication module 218*a* can transmit trackpad/touchpad data (e.g., a coordinate) from a trackpad/touchpad included in the input component 210*a* to the third communication module 228. In a similar manner, a first communication module 218*b* included in the input component 210*b* transmits keystroke data from a keyboard component included in the input component 210*b* to the third communication module 228. The first communication module 218*b* can also transmit trackpad/touchpad data (e.g., a coordinate) from a trackpad/touchpad included in the input component 210*b* to the third communication module 228 included in the central computing device 252*a*.

The display components 212*a-b* can each include a display device (e.g., an LCD, a light emitting diode (LED) display, or plasma display), a SOC, one or more speakers, and second communication modules 216*a-b*, respectively. Each second communication module 216*a-b* can receive audio and/or video data (e.g., streaming video data) from a fourth communication module 226 included in the central computing device 252*a*. The SoC can decode the received video data. The SoC can include codecs for hardware decoding of one or more video compression formats (e.g., V8, H.264/MPEG-4 Advanced Video Coding (AVC)). The decoded video data can be converted into signals needed to drive the display device. For example, a low-voltage differential signaling (LVDS) LCD-panel interface can provide received streaming video to an LCD-panel timing controller included in an LCD device. In addition, the decoded video data can be converted into signals that can be provided to an audio output device (a speaker).

The central computing device 252*a* can communicate wirelessly using at least one type of wireless interface. The central computing device 252*a* can also communicate with the network device 206. The network device 206 can be capable of communications with the central computing device 252*a* and network 202. For example, the network device 206 can be a router, a cable modem, a digital subscriber loop (DSL) modem or other type of modem. The network device 206 may also be a combination of one or more devices that allow the central computing device 252*a* access to a computer network (e.g., the network 202) such as the internet.

In some implementations, the network device 206 may be included as part of the central computing device 252*a*. For example, the network device 206 may be a component (e.g., a printed circuit board or other hardware) that can be incorporated with/into the central computing device 252*a*.

The central computing device 252*a* can access a content server 208 to obtain content requested by users 266*a-b* of the cast terminals 214a-b, respectively. For example, a compute engine 227 included in the central computing device 252a can receive keystroke data (and other input data) sent by the first communication modules 218a-b included in the cast terminals 214a-b, respectively, to the third communication module 228 included in the central computing device 252a.

For example, the compute engine 227 can interpret the keystroke data sent by the first communication module 218a in order to identify content requested by the user 266a of the cast terminal 214a. The central computing device 252a can communicate the request for the content to the content server 208 using the fourth communication module 226 and the network device 206 by way of the network 202. In some implementations, the central computing device 252a may include an additional communication module for communicating with the network device 206. In some implementations, the central computing device 252a may include a single communication module that may be used to communicate with the first communication modules 218a-b, the second communication modules 216a-b, and the network device 206.

The content server 208 can provide the requested content to the central computing device 252a, and specifically to the compute engine 227. For example, the compute engine 227 can be included as part of (or may host) a casting enabled application resident on the primary processing device 104 that can receive the input data and the content and that can further provide the content to the fourth communication module 226 for transmitting to the second communication module 216a included in the cast terminal 214a.

In some implementations, the compute engine 227 can be included as part of a web browser application resident on the central computing device 252a. The web browser application can provide or "cast" a tab or page of the web browser application in order to provide requested content to a cast terminal. For example, a casting API can be used for browser-based real-time communications. The web browser application can provide or "cast" a different tab or page of the web browser application for each cast terminal that is in communication with the central computing device 252a.

For example, the web browser application can provide or "cast" a tab or page (e.g., a first tab 270) of the web browser application for use by the user 266a while interacting with the cast terminal 214a. The user 266a of the cast terminal 214a can requested and be provided with content 260 in the first tab 270 while using the cast terminal 214a. In addition, the user 266a can interact with input devices (e.g., a keyboard component, a trackpad/touchpad) included in the input component 210a to provide input to and otherwise control the operation of the content 260.

In addition, or in the alternative, the web browser application can provide or "cast" a tab or page (e.g., a second tab 272) of the web browser application for use by the user 266b while interacting with the cast terminal 214b. The user 266b of the cast terminal 214b can requested and be provided with content 262 in the second tab 272 while using the cast terminal 214b. In addition, the user 266b can interact with input devices (e.g., a keyboard component, a trackpad/touchpad) included in the input component 210b to provide input to and otherwise control the operation of the content 262.

Though two cast terminals are shown and described with reference to FIG. 2A, in some implementations, more than two cast terminals may be communicatively coupled to the central computing device 252a. In these implementations, the cast terminals will operate as described for the cast terminals 214a-b.

In some implementations, the content 260 and the content 262 can be different content. For example, the central computing system 250 may be located in a classroom. A teacher or other individual in authority in the classroom (e.g., user 268) can interact with the I/O devices 252b. A first student can be assigned to/allowed to use the cast terminal 214a (e.g., the user 266a). A second student can be assigned to/allowed to use the cast terminal 214b (e.g., the user 266b). In some cases, more than one student may be assigned to/allowed to use a cast terminal.

Figure 2C:
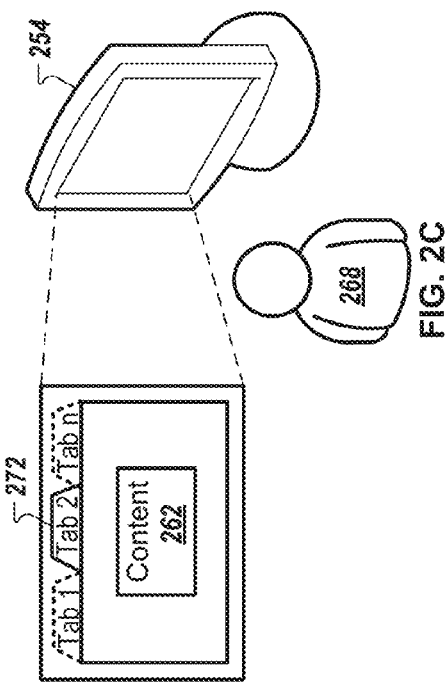
FIGS. 2B-D are diagrams that illustrate content displayed on a display component for a first computing device, a display component for a second computing device, and a display device included in a central computing system, respectively.
Figure 2B:
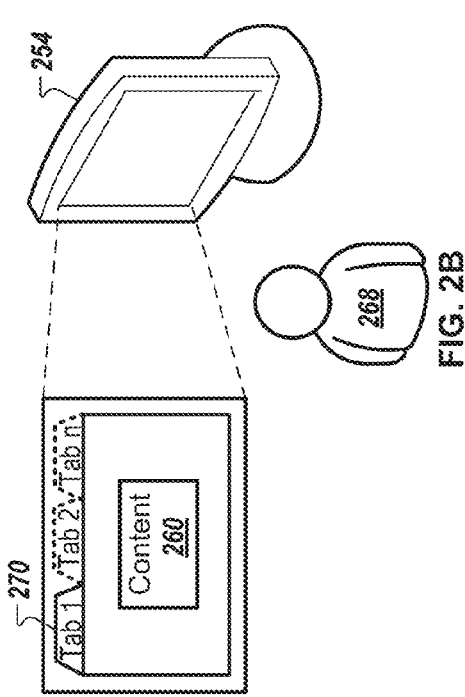

Referring to FIGS. 2A-D, the user 266a may request and interact with the content 260 in the tab 270. The user 266b may request and interact with the content 262 in the tab 272. The user 268, using the display device 254, can also view and interact with the content 260 in tab 270 and the content 262 in tab 272, as shown in FIG. 2B and FIG. 2C, respectively.

Figure 2D:
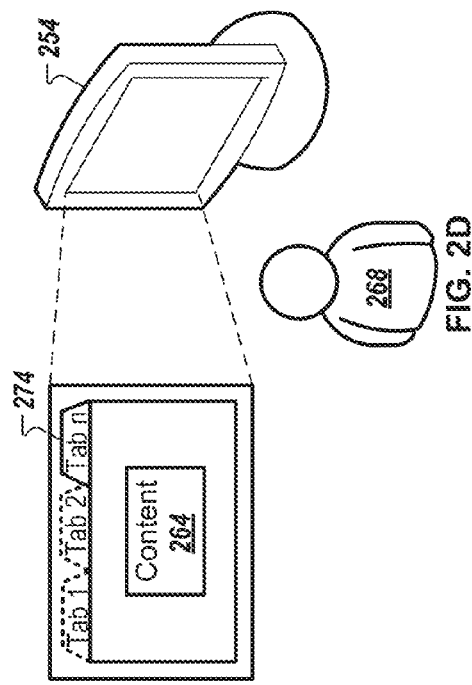

In addition, or in the alternative, the user 268 can interact with the I/O devices 252b to provide input to the central computing device 252a in order for the web browser application to open a tab 274. The user 268 can interact directly with the web browser application resident on the central computing device 252a. The user 268 can select one or more tabs or pages in the web browser application that may be already open and, in addition, the user 268 can open additional tabs or pages in the web browser application. The user 268 can request content 264 for viewing and interacting with in the tab 274 as shown in FIG. 2D. As such, the user 268 can monitor the interactions with the content 260 in the tab 270 by the user 266a, as shown in FIG. 2B. The user 268 can monitor the interactions with the content 262 in the tab 272 by the user 266b, as shown in FIG. 2C. The user 268 can also view and interact with the content 264 in the tab 274, as shown in FIG. 2D.

In some implementations, the content 264 may not be viewed by the user 266a on the cast terminal 214a and by the user 266b on the cast terminal 214b. In other implementations, the user 268 may push the content 264 in the tab 274 to either or both of the cast terminals 214a-b for viewing by the users 268a-b, respectively. In these cases, the tab 274 may be available for selection by the user 268a and/or the user 268b along with the tab 270 and the tab 272 already provided to/casted to the cast terminals 214a-b, respectively.

In a non-limiting example, the users 266a-b may be students, and the user 268 may be a teacher. The central computing system 250 may be located in a classroom (e.g., at the desk of the teacher). The user 266a is using the cast terminal 214a while sitting at a desk and the user 266b is using cast terminal 214b while sitting at another desk. The users 266a-b have been given an assignment to write a paper about Abraham Lincoln. The user 266a may request and be provided with the content 260 in the casted tab 270. The content 260 may be a word processing application that the user 268a can interact with using the cast terminal 214a. The user 268 can monitor the content 260 by accessing the tab 270 in the web browser application, for example, interactively providing the user 268a with feedback as they are writing a paper. The user 266b may request and be provided with the content 262 in the casted tab 272. The content 262 may be a video about Abraham Lincoln that the user 268b may view in order to learn about Abraham Lincoln's life. The user 268 can monitor the content 262 by accessing the tab 272. The user 268 may not necessarily view the video but will know that the user 268b is viewing a particular video.

In another non-limiting example, the users 266a-b may be students, and the user 268 may be a teacher. The central computing system 250 may be located in a classroom (e.g., at the desk of the teacher). The user 266a is using the cast terminal 214a while sitting at a desk and the user 266b is using cast terminal 214b while sitting at another desk. Based on the user 268 interacting with the web based application resident on the central computing device 252a, the central computing device 252a, using the process and methods described herein, can provide the same casted tab with the same content to both cast terminals 214a-b for viewing by the users 268a-b, respectively. The user 268 can also be viewing and interacting with the content in the tab using the I/O devices 252b. For example, the teacher may provide the students with a math problem that the class will work on together. The math problem can be provided by and viewed in the casted tab by each user 268a-b using the cast terminals 214a-b, respectively. In addition, the user 268 as well as users 268a-b may interact with the content.

In another non-limiting example, the central computing system 250 may be located in a residence and cast terminals 214a-b may be electronic photo frames. In this example, the cast terminals 214a-b may not be integrated devices (the display components 212a-b and the input components 210a-b may be separate components (as will be shown and described with reference to FIG. 3)). In addition, the input components 210a-b may not be needed or included with the cast terminals 214a-b. As such, the cast terminals 214a-b may include display components 212a-b. The user 268 can interact with the web based application resident on the central computing device 252a. The user can open a first tab in the web based application and select an first image for viewing in the first tab. In some cases, the first image may be stored locally on the central computing system. In some cases, the first image may be stored in the cloud or on a server accessible by way of the network device 206 accessing the network 202. The central computing device 252a, using the process and methods described herein, can provide a casted first tab with the first image to cast terminal 214a, and specifically to the display component 212a. In addition, the user can open a second tab in the web based application and select a second image for viewing in the second tab. The central computing device 252a, using the process and methods described herein, can provide a casted second tab with the second image to cast terminal 214b, and specifically to the display component 212b. A user can, therefore, place multiple electronic photo frames in multiple places within a house and use the central computing system 250 to control the images displayed by each of the electronic photo frames.

Figure 2E:
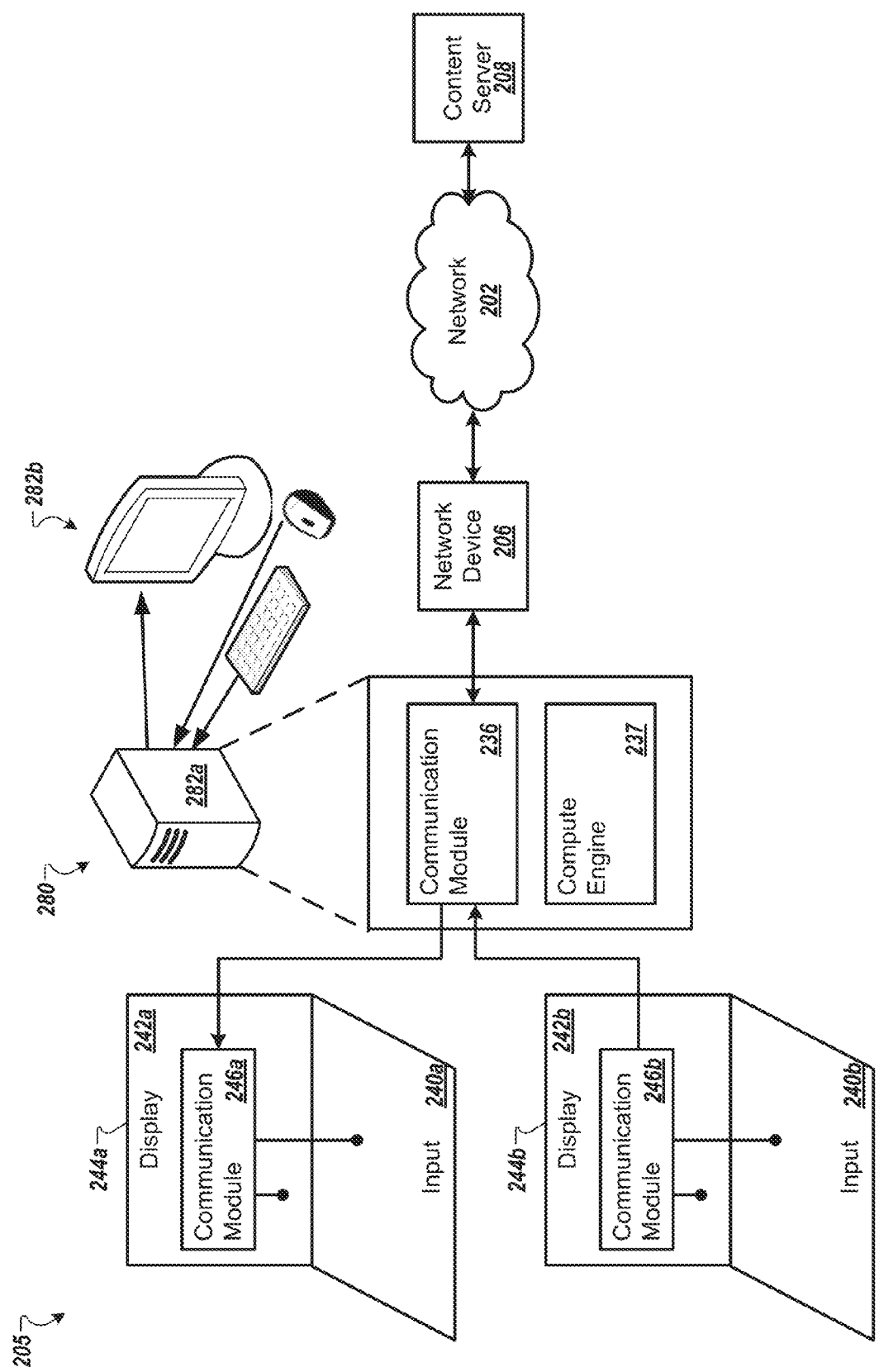
FIG. 2E is a diagram that illustrates example computing devices for use in a system that includes a central computing system, where each computing device communicates with a central computing device included in the central computing system using a single communication protocol.

FIG. 2E is a diagram that illustrates example computing devices (e.g., cast terminals 244a-b) for use in a system 205 that includes a central computing system 280, where each computing device (e.g., the cast terminals 244a-b) communicates with a central computing device 282a included in the central computing system 280 using a single communication protocol. The central computing system 280 includes I/O devices 282b.

Referring to FIG. 2A, in some implementations, the cast terminals 244a-b can be communicatively coupled to the central computing device 282a along with the cast terminals 214a-b. In other implementations, the cast terminals 244a-b can be communicatively coupled to the central computing device 282a instead of (replacing) the cast terminals 214a-b.

Though two cast terminals are shown and described with reference to FIG. 2E, in some implementations, more than two cast terminals may be communicatively coupled to the central computing device 282a. In these implementations, the cast terminals will operate as described for the cast terminals 244a-b.

The cast terminals 244a-b function in a similar manner to the cast terminals 214a-b. The cast terminals 244a-b include respective input components 240a-b that function in a similar manner to the input components 210a-b. Display components 242a-b included in the cast terminals 244a-b function in a similar manner to the display components 212a-b. The cast terminals 244a-b include respective first single communication modules 246a-b that are each communicatively coupled to a second single communication module 236 included in the central computing device 282a. The first single communication modules 246a-b transmit input data from the respective input components 240a-b to the second single communication module 236 included in the central computing device 282a. Each of the first single communication modules 246a-b receive content (e.g., video and/or audio data) transmitted by the second single communication module 236 included in the central computing device 282a. A compute engine 237 included in the central computing device 282a functions in a similar manner to the compute engine 227. The central computing device 282a obtains the content in a similar manner as the central computing device 252a.

The cast terminals 244a-b each include a single communication module (first single communication modules 246a-b) capable of bidirectional communication. The second single communication module 236 is capable of bidirectional communication with both the cast terminals 244a-b and the network device 206. Though the first single communication modules 246a-b are shown as being located in the display component 242b, in some implementations, the first single communication modules 246a-b may be included in the input component 240b.

Figure 2F:
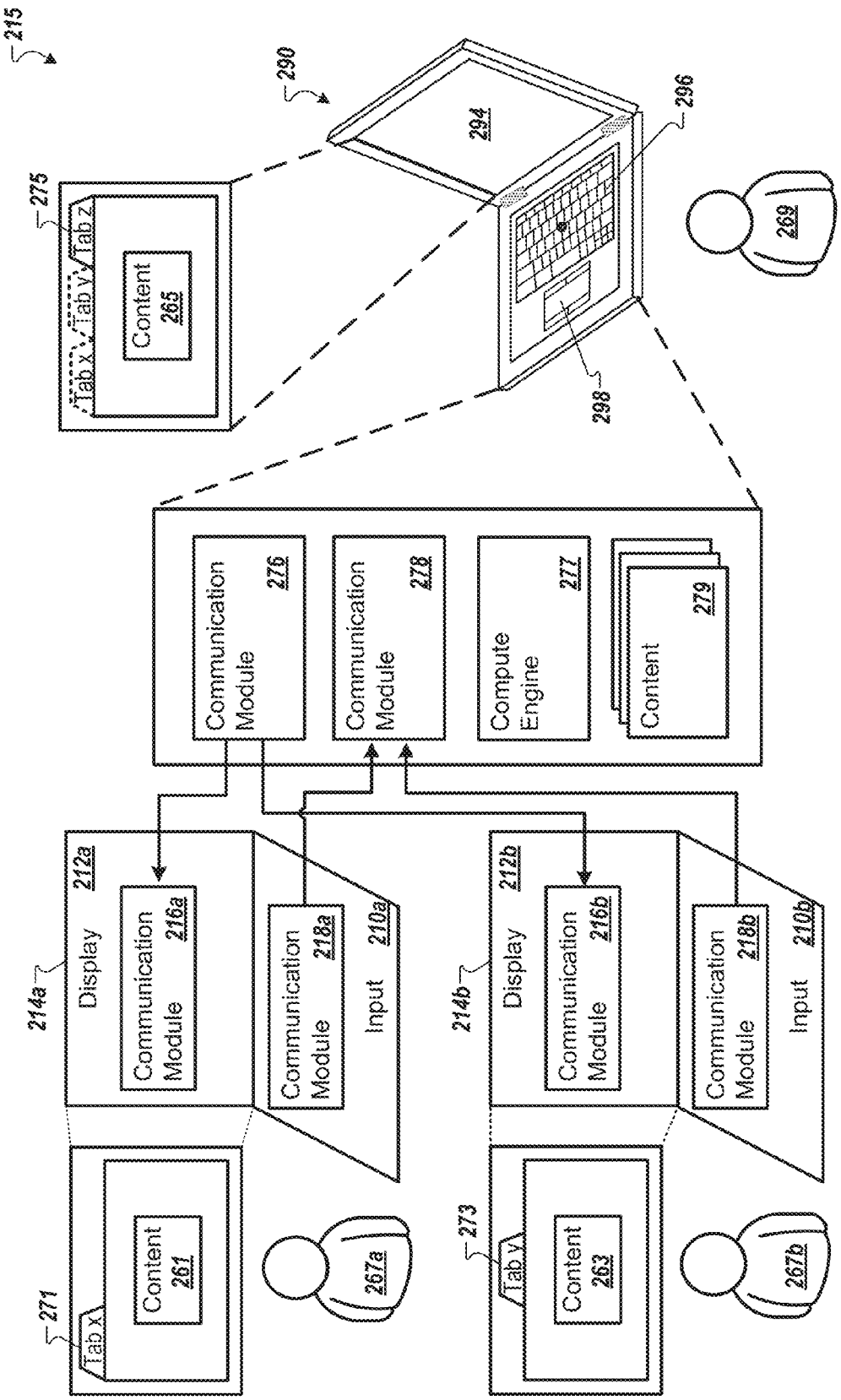
FIG. 2F is a diagram that illustrates example computing devices for use in a system that includes a central computing system.

FIG. 2F is a diagram that illustrates example computing devices (e.g., cast terminals 214a-b) for use in a system 215 that includes a central computing system 290. The central computing system 290 includes a display device 294, a keyboard 296 and a trackpad/touchpad 298. In some implementations, the display device 294 can be a touchscreen.

A content storage 279 can include content (e.g., files) stored locally on the central computing system 290. The content can include, but is not limited to, video files, music files, and document files.

The cast terminals 214a-b can utilize the computing power of the central computing system 290 and can access the content included in the content storage 279 included on the central computing system 290. The input components 210a-b include the first communication modules 218a-b, respectively. The first communication modules 218a-b transmit keystroke data from a keyboard component included in the input components 210a-b, respectively, to a third communication module 278 included in the central computing system 290. The first communication module 218a-b can also transmit trackpad/touchpad data (e.g., a coordinate) from a trackpad/touchpad included in the input components 210a-b, respectively, to the third communication module 278 included in the central computing system 290.

The display components 212a-b can include a display device and the second communication modules 216a-b, respectively. The second communication modules 216a-b can receive audio and/or video data (e.g., streaming video data) from a fourth communication module 276 included in the central computing system 290. The central computing system 290 can communicate with each of the cast terminals 214a-b wirelessly using at least one type of wireless interface.

The users 267a-b of the cast terminals 214a-b, respectively, can request content (e.g., one or more files) stored in the content storage 279. The central computing system 290 can provide the requested content to a compute engine 277. For example, the compute engine 277 can be included as part of (or may host) a casting enabled application resident on the central computing system 290 that can receive input data from the third communication module 278 and content from the content storage 279. The compute engine 277 can provide the content from the content storage 279 to the fourth communication module 276 for transmitting to the second communication modules 216a-b included in the respective cast terminals 214a-b. The content can be displayed on a respective display devices included in the display components 212a-b as discussed herein.

In some implementations, the compute engine 277 can be included as part of a web browser application resident on the central computing system 290. The web browser application can provide or "cast" a tab or page of the web browser application (e.g., a tab 271). The web browser application can display/provide content included in the content storage 279 in the tab or page of the web browser application (e.g., the tab 271). For example, a casting API can be used for browser-based real-time communications. A user 267a of the cast terminal 214a can interact with the casted tab 271 of the web-browser application (e.g., they can provide input to and view output in the casted tab (interact with content 261) using the cast terminal 214a as described herein).

As described with reference to FIGS. 2A-D, the user 267a may request and interact with the content 261 in the tab 271. A user 267b may request and interact with the content 263 in a tab 273. A user 269, using the display device 294, the keyboard 296 and/or the trackpad/touchpad 298 can also view and interact with the content 261 in tab 271 and the content 263 in tab 273.

In addition, or in the alternative, the user 269 can open a tab 275 in the web browser application. The user 269 can interact directly with the web browser application resident on the central computing system 290. The user 269 can select one or more tabs or pages in the web browser application that may be already open and, in addition, the user 269 can open additional tabs or pages in the web browser application. The user 269 can request content 265 for viewing and interacting with in the tab 275. As such, the user 269 can monitor the interactions with the content 261 in the tab 271 by the user 267a. The user 269 can monitor the interactions with the content 263 in the tab 273 by the user 267b. The user 269 can also view and interact with the content 265 in the tab 275.

Though two cast terminals are shown and described with reference to FIG. 2F, in some implementations, more than two cast terminals may be communicatively coupled to the central computing system 290. In these implementations, the cast terminals will operate as described for the cast terminals 214a-b.

In some implementations, referring to FIG. 2E, one or more cast terminals similar to the cast terminals 244a-b can be communicatively coupled to the central computing system 290 along with the cast terminals 214a-b. In other implementations, the cast terminals 244a-b can be communicatively coupled to the central computing system 290 a instead of (replacing) the cast terminals 214a-b.

FIG. 2G is a diagram of example computing devices (e.g., cast terminals 244a-b) for use in a system 225 that includes a network device 207 operatively coupled to each cast terminal 244a-b and operatively coupled to a central computing device 293a. A central computing system 291 includes I/O devices 293b and the central computing device 293a.

The cast terminals 244a-b include respective first single communication modules 246a-b that are each communicatively coupled to the network device 207. The network device 207 is communicatively coupled to a second single communication module 235 included in the central computing device 293a. The first single communication modules 246a-b transmit input data from the respective input components 240a-b to the network device 207. The network device 207 sends the received input data to the second single communication module 235 included in the central computing device 293a. Each of the first single communication modules 246a-b receive content (e.g., video and/or audio data) transmitted by the second single communication module 235 included in the central computing device 293a by way of the network device 207. A compute engine 233 included in the central computing device 293a functions in a similar manner to the compute engine 277. The central computing device 293a obtains the content (e.g., from a content storage 231) in a similar manner as the central computing system 290.

The cast terminals 244a-b each include a single communication module (first single communication modules 246a-b) capable of bidirectional communication. The second single communication module 235 is capable of bidirectional communication with the network device 207.

The system 225 can communicatively couple the cast terminals 244a-b to the central computing system 291, and specifically to the central computing device 293a. The cast terminals 244a-b can communicate wirelessly with the network device 207 using the first single communication modules 246a-b, respectively. In addition, the central computing device 293a can communicate wirelessly with the network device 207 using the second single communication module 235. In the system 225, each of the cast terminals 244a-b, the network device 207, and the central computing system may be physically placed in different locations.

In some implementation, the central computing device 293a may access a network (e.g., the network 202) in order to obtain content located on a content server (e.g., the content server 208). In these implementations, the central computing device 293a may access the network using an additional network device, different from the network device 207. For example, the additional network device may be incorporated with/included in the central computing device 293a. The central computing device 293a may access a network (e.g., the network 202) using a wireless or a wired communications connection. For example, the central computing device 293a may communicate/access the network (e.g., the network 202) using a wireless communication interface. In another example, the central computing device 293a may communicate/access the network (e.g., the network 202) using a wired network connection.

As a non-limiting example, the system 225 can be placed in a school. The network device 207 may be placed in one location within the school building. The network device 207 can be a WiFi router. The cast terminal 244a may be placed in a first classroom and communicate using a WiFi connection with the network device 207. The cast terminal 244b may be placed in a second classroom and communicate using a WiFi connection with the network device 207. The central computing system 291 may be placed in a central location within the school building, for example, in the front office or in the library. The central computing device 293a can communicate with the network device 207 using a WiFi connection. The central computing device 293a can then communicate with each of the cast terminals 244a-b using the network device 207.

FIG. 3A is a diagram of example computing components 300 (e.g., display component 312 and input component 310) for use in the systems disclosed herein. The computing components 300 can function in a similar manner as a cast terminal (e.g., the cast terminals disclosed herein) where the display component 312 is decoupled from/separate from the input component 310.

The display component 312 includes a first communication module 316. The first communication module 316 can be communicatively coupled to/interfaced with the devices disclosed in FIGS. 1A-F and FIGS. 2A-G. In some implementations, the first communication module 316 is capable of bidirectional communication with an external device.

The input component 310 includes a second communication module 318 that can be communicatively coupled to/interfaced with a third communication module 317 included in the display component 312. In some implementations, the second communication module 318 and the third communication module 317 are capable of unidirectional communication. For example, the input component provides input data to the display component 312 by sending the data from the second communication module 318 to the third communication module 317, which receives the input data. The first communication module 316, communicatively coupled to/interfaced with a device, can then send the input data to the device.

In a non-limiting example, the input component 310 can communicate wirelessly with the display component 312 using Bluetooth. The second communication module 318 (e.g., a Bluetooth transmitter) can transmit the input data to the third communication module 317 (e.g., a Bluetooth receiver). The first communication module 316 (e.g., a WiFi transmitter/receiver) is capable of bidirectional communication, and can transmit the input data to a device as well as receive content from the device.

FIG. 3B is a diagram of an example computing components 350 (e.g., display component 322 and input component 320) for use in the systems disclosed herein. The computing components 350 can function in a similar manner as a cast terminal (e.g., the cast terminals disclosed herein) where the display component 322 is decoupled from/separate from the input component 320.

The display component 322 includes a first communication module 326. The first communication module 326 can be communicatively coupled to/interfaced with the devices disclosed in FIGS. 1A-F and FIGS. 2A-G. In some implementations, the first communication module 326 is capable of unidirectional communication with an external device.

The input component 320 includes a second communication module 328 that can be communicatively coupled to/interfaced with the devices disclosed in FIGS. 1A-F and FIGS. 2A-G. In some implementations, the second communication module 328 is capable of unidirectional communication with the device. For example, the input component provides input data to the device by sending the data from the second communication module 318 to the communication module included in the device, which receives the input data. The first communication module 316, communicatively coupled to/interfaced with a device, can receive content from the device.

In a non-limiting example, the input component 320 can communicate wirelessly with a device. The second communication module 318 (e.g., a Bluetooth transmitter) can transmit the input data to a third communication module 317 (e.g., a Bluetooth receiver) included in the device. The first communication module 316 (e.g., a WiFi receiver) is capable of unidirectional communication, and can receive the content from the device.

Figure 4:
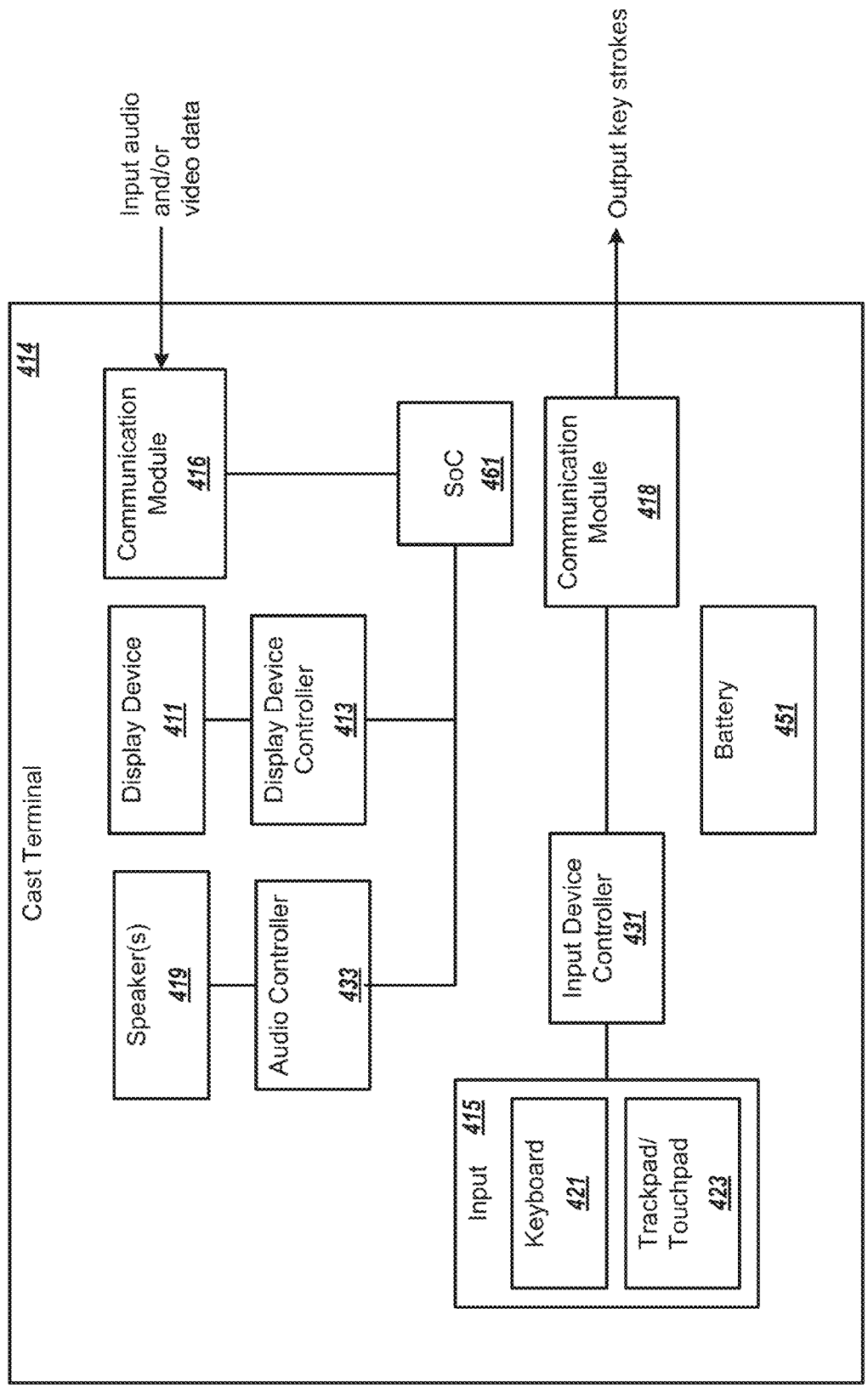
FIG. 4 is a block diagram of an example cast terminal.

FIG. 4 is a block diagram of an example cast terminal 414. The example cast terminal 414 includes input devices 415, an input device controller 431, and a first communication module 418. Referring to FIGS. 1A-F, 2A, 2E-G and 3A-B, the input devices 415, the input device controller 431, and the first communication module 418 can be included in the input component 110, the input components 210a-b, the input component 310, and the input component 320.

The example cast terminal 414 includes a display device 411, a display device controller 413, speaker(s) 419, an audio controller 433, a second communication module 416 and a System on a Chip (SoC) 461. Referring to FIGS. 1A-F, 2A, 2E-G and 3A-B, the display device 411, the display device controller 413, the second communication module 416, the speaker(s) 419, the audio controller 433, and the SoC 461 can be included in the display component 112, the display components 212a-b, the display component 312, and the display component 322. The example cast terminal 414 can be considered a stateless laptop because the stateless cast terminal does not include (excludes) a central processing unit (CPU).

A battery 451 can provide the power needed by the cast terminal 414. In some implementations, the battery 451 can be integrated in/included in a housing or other type of enclosure for the cast terminal 414 that includes the display device 411, the display device controller 413, the second communication module 416, the SoC, the input devices 415, the input device controller 431 and the first communication module 418. In some implementations, a housing or other type of enclosure can include the display device 411, the display device controller 413, the second communication module 416, the SoC, the input devices 415, the input device controller 431 and the first communication module 418, and the battery 451 can connect to the enclosure but be located separately and outside of the enclosure.

In some implementations, the second communication module 416 can be capable of unidirectional communication. In some implementations, the second communication module 416 can be capable of bidirectional communication. The second communication module 416 can communicate wirelessly with an external device. Communication protocols supported by the second communication module 416 can include, but are not limited to, WiFi (IEEE 802.11), Bluetooth, Bluetooth Low Energy (LE), and wireless infrared communications (IrDA). The selection of the communication protocol for the implementation of the second communication module 416 can be based on one or more factors that can include, but are not limited to, the distance between the cast terminal 414 and the device it needs to connect to/interface with, and whether unidirectional or bidirectional communications are needed.

The second communication module 416 can receive audio and/or video data (e.g., streaming video data) from a device. The second communication module 416 can provide the received audio and/or video data to the SoC 461. The received audio and/or video data can be encoded and compressed. The SoC 461 can include codecs for hardware decoding of one or more video compression formats (e.g., V8 and H.264/MPEG-4 Advanced Video Coding (AVC)) that include both audio and video data. The SoC 461 can decode the audio and/or video data and can convert the audio and/or video data into video signals for the display device 411 and into audio signals for the speakers 419.

The display device 411 can be an LCD, light emitting diode (LED) display, plasma display, or other type of display device. A display device controller 413 can receive the decoded video signals from the SoC 461. The display device controller 413 can process the decoded video signals into the electrical signals needed to drive the display device 411. For example, the display device 411 can be an LCD and the display device controller 413 can be a low-voltage differential signaling (LVDS) LCD-panel interface that can provide the received decoded video signals to an LCD-panel timing controller included in an LCD device.

An audio controller 433 can receive the decoded audio signals from the SoC 461. The audio controller 433 can process the decoded audio signals into the electrical signals needed to drive the speaker(s) 419.

A user of the cast terminal 414 can interact with the input devices 415. The input device controller 431 can receive input data from the input devices 415. For example, the input device controller 431 can receive keystroke data from a keyboard 421. The input device controller 431 can receive input data (e.g., location coordinates) from a trackpad/touchpad 423. The input device controller 431 can receive input data (e.g., "clicks", location coordinates) from a pointing device 525 (e.g., a mouse). The input device controller 431 can provide the received input data to the first communication module 418. The first communication module 418 can transmit the input data to a device.

Referring to FIGS. 1A-F, 2A, 2E-G and 3A-B, the display device 411, the display device controller 413, the second communication module 416, the speaker(s) 419, the audio controller 433, and the SoC 461 can be included in the display component 112, the display components 212a-b, the display component 312, and the display component 322. Referring to FIGS. 1A-F, 2A, 2E-G and 3A-B, the input devices 415, the input device controller 431, and the first communication module 418 can be included in the input component 110, the input components 210a-b, the input component 310, and the input component 320. In some implementations, the inclusion of the particular modules and controllers in the individual components can allow each component to act independently of the other.

Though FIG. 4 shows particular individual components and modules, in some implementations, a cast terminal can include additional components or fewer components. In some implementations, the display device controller 413 and the audio controller 433 may be included in the SoC 461. In some implementations, the display device controller 413 and the audio controller 433 may be a single controller that can drive the display device 411 and the speaker(s) 419. In some implementations, for example referring to FIGS. 1B, 1D, 1F, 2E and 2G, the example cast terminal 414 may not include the first communication module 418, using the second communication module 416 for bidirectional communication with a device. The second communication module 416 can be configured to transmit input data and to receive content.

FIG. 5 is a flowchart that illustrates a method 500 for displaying content on a computing device. In some implementations, the systems described herein can implement the method 500. For example, the method 500 can be described referring to FIGS. 1A-F, 2A-G, 3A-B, and 4.

Keystroke data is transmitted (block 502). For example, referring to FIGS. 1A, 1C and 1E, a first communication module (e.g., first communication module 118) included in a cast terminal (e.g., the cast terminal 114) can transmit the keystroke data. The keystroke data can be transmitted to a primary processing device (e.g., the primary processing device 104) over a first wireless network using a first wireless communication protocol (e.g., Bluetooth). The keystroke data can control an application interface associated with an application via processing performed at the primary processing device (e.g., the primary processing device 104) executing at the primary processing device (e.g., the primary processing device 104).

A second communication module receives multimedia data (block 504). Referring to FIGS. 1A, 1C and 1E, the second communication module (e.g., the second communication module 116) is included in the cast terminal (e.g., the cast terminal 114). The multimedia data is received from the primary processing device (e.g., the primary processing device 104) over a second wireless network using a second wireless communication protocol (e.g., WiFi). The multimedia data is generated by the primary processing device (e.g., the primary processing device 104) from the received keystroke data.

Figure 6:
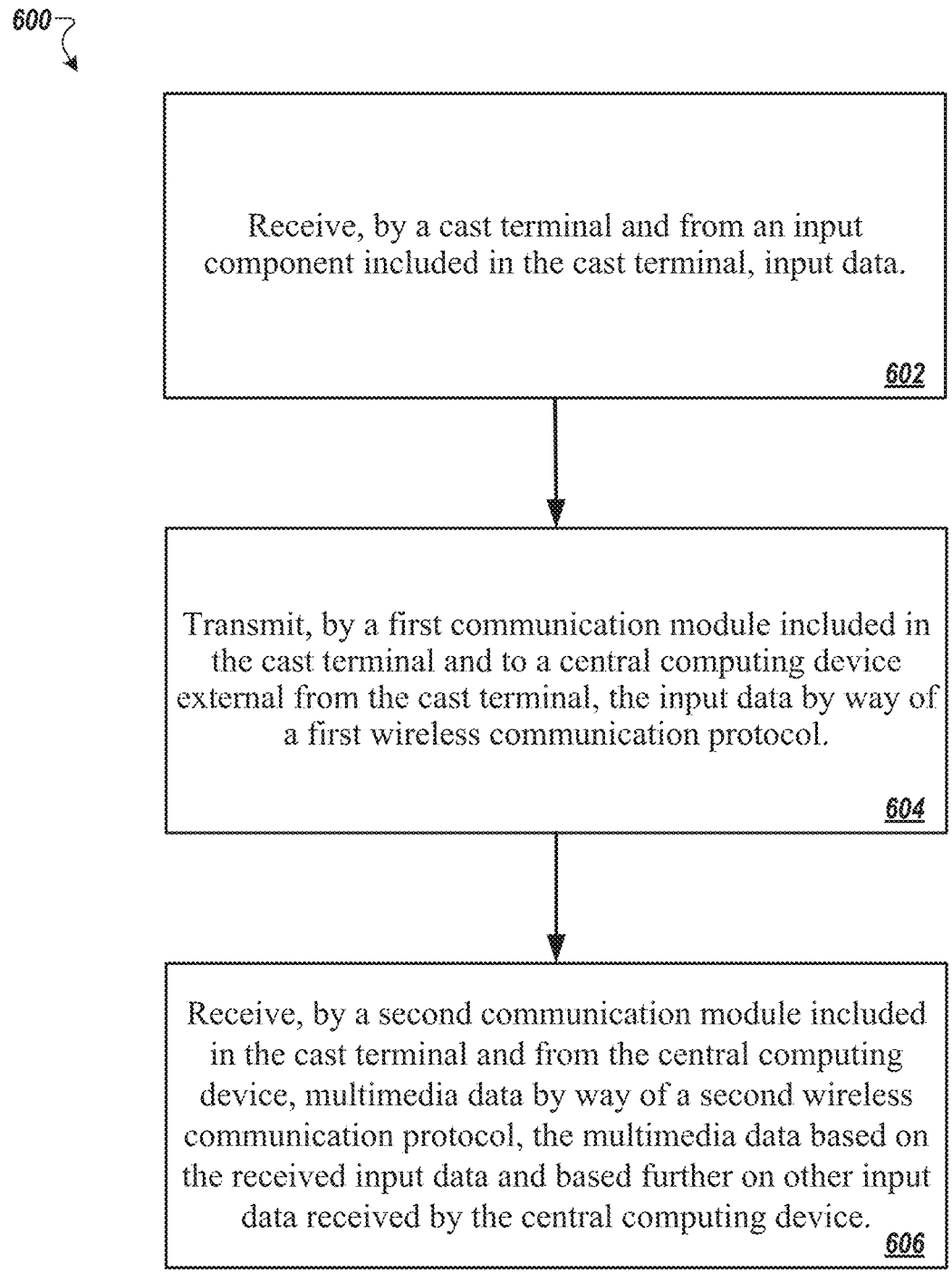
FIG. 6 is a flowchart that illustrates an alternative method for displaying content on a computing device.

FIG. 6 is a flowchart that illustrates an alternative method 600 for displaying content on a computing device. In some implementations, the systems described herein can implement the method 600. For example, the method 600 can be described referring to FIGS. 1A-F, 2A-G, 3A-B, and 4.

Input data is received from an input component (block 602). For example, referring to FIGS. 2A and 2F, a cast terminal (e.g., the cast terminal 214a) can receive input data (e.g., keystroke data) from an input component (e.g., a keyboard) included in the cast terminal (e.g., the cast terminal 214a).

The input data is transmitted by a first communication module (block 604). For example, referring to FIGS. 2A and 2F, a first communication module (e.g., the first communication module 218a) included in a cast terminal (e.g., the cast terminal 214a) can transmit the input data to a central computing device (e.g., the central computing device 250, the central computing device 290) external from the cast terminal (e.g., the cast terminal 214a) by way of a first wireless communication protocol (e.g., Bluetooth).

Multimedia data is received by a second communication module (block 606). For example, referring to FIGS. 2A and 2F, the second communication module (e.g., the second communication module 216a) is included in a cast terminal (e.g., the cast terminal 214a). The multimedia data is received from the central computing device (e.g., the central computing device 250, the central computing device 290) by way of a second wireless communication protocol (e.g., WiFi). The multimedia data can be based on the received input data and based further on other input data received by the central computing device (e.g., the central computing device 250).

Figure 7:
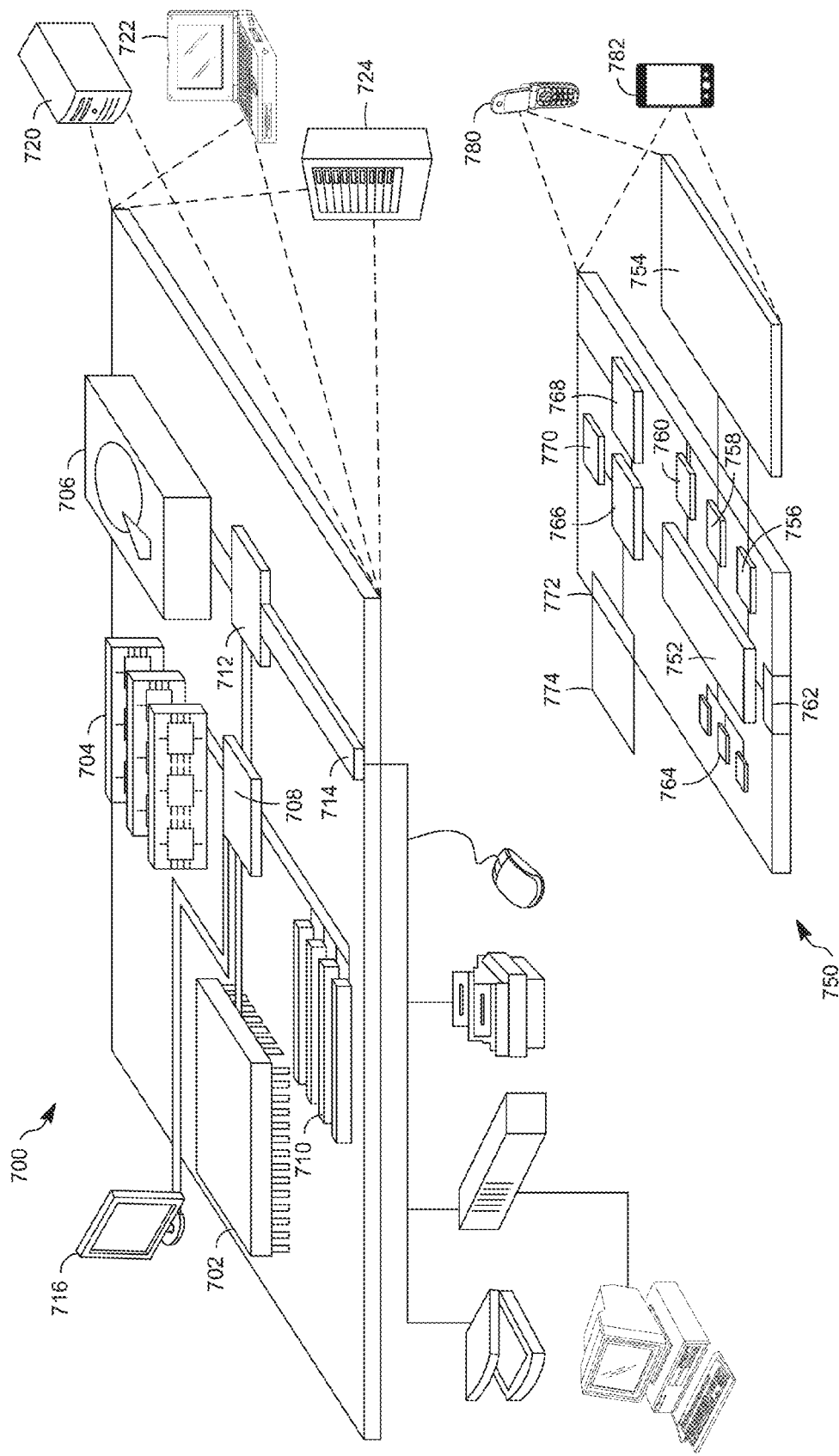
FIG. 7 shows an example of a computer device and a mobile computer device that can be used to implement the techniques described herein.

FIG. 7 shows an example of a generic computer device 700 and a generic mobile computer device 750, which may be used with the techniques described herein. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing system comprising:
   a cast terminal being a stateless laptop computing device including a keyboard component and a display component physically coupled to the keyboard component; and
   a central computing device external to the cast terminal,
      the keyboard component including a first communication module configured to transmit keystroke data over a first wireless network to the central computing device using a first wireless communication protocol,
      the display component including a second communication module configured to receive multimedia data over a second wireless network from the central computing device using a second wireless communication protocol, and
      the central computing device including a third communication module configured to receive the keystroke data from the first wireless network, and a fourth communication module configured to transmit the multimedia data over the second wireless network.

2. The computing system of claim 1, wherein the central computing device is included in a central computing system that includes at least one input device operatively coupled to the central computing device, and at least one output device each operatively coupled to the central computing device.

3. The computing system of claim 2, wherein the at least one output device is a display device and the at least one input device is a keyboard device.

4. The computing system of claim 1, wherein the keystroke data controls an application interface associated with an application executing in a compute engine on the central computing device, the application interface allowing the control of processing performed by the compute engine.

5. The computing system of claim 4, wherein the at least one input device is a keyboard device and wherein input received by the central computing device and from the keyboard device further controls the application interface associated with the application.

6. The computing system of claim 1, wherein the central computing device is configured to:
receive the keystroke data from the keyboard component over the first wireless network using the first wireless communication protocol,
generate the multimedia data from the keystroke data, and
transmit the multimedia data to the display component over the second wireless network using the second wireless communication protocol.

7. The computing system of claim 1 further comprising:
a network device including a router, the router in communication with the central computing device using a third network including at least one of a wired network or a wireless network, and in communication with a server using a fourth network including at least one of a wired network or a wireless network, the server being configured to transmit the multimedia data to the central computing device by way of the router using the third and fourth networks.

8. The computing system of claim 1, wherein the second wireless communication protocol is different from the first wireless communication protocol.

9. The computing system of claim 1, wherein the first wireless communication protocol includes at least one of Bluetooth and WiFi for communication via the first wireless network, and wherein the second wireless communication protocol includes at least one of Bluetooth and WiFi for communication via the second wireless network.

10. The computing system of claim 1, wherein the cast terminal is a first cast terminal, the keyboard component is a first keyboard component, and the display component is a first display component, and the computing system further includes:
a second cast terminal including a second keyboard component and a second display component physically coupled to the second keyboard component,
the second keyboard including a fifth communication module configured to transmit keystroke data over a fifth wireless network to the central computing device using the first wireless communication protocol,
the second display component including a sixth communication module configured to receive multimedia data over the second wireless network from the central computing device using the second wireless communication protocol.

11. The computing system of claim 10, wherein the multimedia data transmitted by the central computing device and received by the first display component is different from the multimedia data transmitted by the central computing device and received by the second display component.

12. The computing system of claim 11, wherein the central computing device is included in a central computing system that includes at least one output device including a display device, and wherein the display device displays the multimedia data transmitted by the central computing device and received by the first display component and displays the different multimedia data transmitted by the central computing device and received by the second display component.

13. The computing system of claim 12,
wherein the keystroke data controls an application interface associated with an application executing in a compute engine on the central computing device, the application interface allowing the control of processing performed by the compute engine, and
wherein the central computing system further includes at least one input device, the central computing system is configured to:
receive input from the at least one input device, and
control the application interface based on the received input.

14. The computing system of claim 13, wherein controlling the application interface includes one of displaying additional data along with the multimedia data and modifying the multimedia data.

15. The computing system of claim 14, wherein modifying the multimedia data includes adding additional data to be included with the multimedia data.

16. The computing system of claim 10, wherein the multimedia data transmitted by the central computing device and received by the first display component is the same as the multimedia data transmitted by the central computing device and received by the second display component.

17. The computing system of claim 1, wherein:
the keystroke data includes text related data,
generating the multimedia data from the keystroke data includes processing the text related data by converting the text related data into text image data, and
transmitting the multimedia data to the display component over the second wireless network includes transmitting the text image data to the display component for displaying a text image representative of the text related data on the display component for viewing by a user.

18. The computing system of claim 1, wherein:
the keystroke data includes command related data,
generating the multimedia data from the keystroke data includes processing the command related data by converting the command related data into at least one instruction for causing a network device to perform a task, and
transmitting the multimedia data to the display component over the second wireless network includes transmitting output data related to performing the task for displaying data representative of the output data on the display component for viewing by a user.

19. A method for interacting with a cast terminal, the method comprising:
receiving, by the cast terminal and from an input component included in the cast terminal, input data, the cast terminal being a stateless laptop computing device;
transmitting, by a first communication module included in the cast terminal and to a central computing device external from the cast terminal, the input data by way of a first wireless communication protocol; and
receiving, by a second communication module included in the cast terminal and from the central computing device, multimedia data by way of a second wireless communication protocol, the multimedia data based on the received input data and based further on other input data received by the central computing device.

20. A computing system comprising:
a stateless laptop computing device including:
an input component including a first communication module; and
a display component including a second communication module; and
a central computing device external from the stateless laptop computing device, the central computing device including:

a third communication module;
a fourth communication module;
a compute engine;
at least one input device; and
at least one output device;
 the first communication module configured to transmit input data received from the input component to the central computing device over a first wireless network using a first wireless communication protocol,
 the third communication module configured to receive the input data from the first wireless network,
 the compute engine configured to execute an application on the central computing device using the received input data,
 the central computing device configured to control an application interface associated with the application, the application interface allowing a control of processing performed by the compute engine,
 the fourth communication module configured to transmit multimedia data from the compute engine to the stateless laptop computing device over a second wireless network using a second wireless communication protocol,
 the second communication module configured to receive the multimedia data, and
 the stateless laptop computing device configured to display the multimedia data on the display component.

\* \* \* \* \*